(12) United States Patent
Hino

(10) Patent No.: US 6,313,982 B1
(45) Date of Patent: Nov. 6, 2001

(54) PROTECTIVE CASE FOR PORTABLE ELECTRONIC APPARATUS

(75) Inventor: Mariko Hino, Kanagawa-ken (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/402,622

(22) PCT Filed: Feb. 16, 1999

(86) PCT No.: PCT/JP99/00672

§ 371 Date: Jan. 12, 2000

§ 102(e) Date: Jan. 12, 2000

(87) PCT Pub. No.: WO99/41958

PCT Pub. Date: Aug. 19, 1999

(30) Foreign Application Priority Data

Feb. 16, 1998 (JP) .................................................. 10-050154

(51) Int. Cl.⁷ ...................................................... H05K 5/00
(52) U.S. Cl. ............................................. 361/679; 206/320
(58) Field of Search .................................. 150/154, 165; 174/17.05, 17.06, 50.5, 50.51, 52.1; 206/305, 320, 521, 592, 701; 361/600, 679, 728, 730, 752, 807, 809, 814

(56) References Cited

U.S. PATENT DOCUMENTS 5,092,459 * 3/1992 Uljianic et al. ...................... 206/320

FOREIGN PATENT DOCUMENTS

| | | |
|---|---|---|
| 63-122849 | 8/1988 | (JP) . |
| 5-266747 | 10/1993 | (JP) . |
| 6-56932 | 8/1994 | (JP) . |
| 6-70292 | 9/1994 | (JP) . |
| 08046371 | 2/1996 | (JP) . |
| 09023072 | 1/1997 | (JP) . |

* cited by examiner

Primary Examiner—Gregory Thompson
(74) Attorney, Agent, or Firm—Helfgott & Karas, PC

(57) ABSTRACT

Disclosed is a protective case for protecting a portable electronic device against moisture and dust so that the device can be carried anywhere. The protective case has an upper case and a lower case which, by being abutted against each other, form a closed space in a interior of which the portable electronic device (100) is capable of being accommodated. Provided in at least one of the cases is a through-hole at a position opposing an operating element of the portable electronic device accommodated inside the space. The through-hole is closed by a closure member (167) comprising an elastic material and having a push-button (165) that is capable of pushing the operating element of the portable electronic device from the outside. Furthermore, the abutting portion of each case is sealed by a sealing member comprising an elastic material, whereby moisture and dust are positively prevented from penetrating the interior.

37 Claims, 43 Drawing Sheets

PROTECTIVE CASE FOR PORTABLE ELECTRONIC APPARATUS

TECHNICAL FIELD

This invention relates to a protective case for accommodating a portable electronic device used as a slave or hand-held game machine, etc., of an entertainment system such as a video game station.

BACKGROUND ART

Conventional video game stations include those in which a memory card is capable of being removably inserted. A video game station of this kind is so adapted that data that has been accumulated in the video game station is stored on a memory card in advance and, when necessary, the data can be read out of the memory card and transferred to the video game station.

FIG. 46A is a block diagram showing the principal components of a memory card capable of being removably inserted into a conventional video game station of this type.

A memory card 10 has control means 11 for controlling the operation of the memory card, a connector 12 for making a connection to a terminal provided in a slot of a video game station, and a non-volatile memory 16 for storing data. The connector 12 and the non-volatile memory 16 are connected to the control means 11.

The control means 11 is constituted by a microcomputer, by way of example. A flash memory such as an EEPROM, for example, is used as the non-volatile memory 16.

FIG. 46B illustrates the items controlled by the control means 11 of the memory card 10. As illustrated, the memory card 10 has a station connection interface for connection to the console of the video game station, and a memory interface for input and output of data to and from the non-volatile memory.

There is also an arrangement that allows a memory card of the same type to be removably inserted into information equipment other than a video game station.

FIG. 47 is a plan view illustrating an example of the construction of a conventional video game station in which a memory card is capable of being removably inserted.

A conventional video game station 1 has a console 2 accommodated within a substantially quadrangular case, and a centrally provided disk mounting unit 3. An optical disk serving as a recording medium on which the application program of a video game has been recorded is mounted on the disk mounting unit 3. The console 2 is provided with a reset switch 4 for resetting the game at will, a power-supply switch 5, a disk operating switch 6 used when mounting the optical disk on and demounting it from the disk mounting unit 3, and two slots 7A and 7B, by way of example.

The memory card 10 is inserted into at least one of the slots 7A, 7B so that data, such as the results of a game that has been run on the video game station 1, are written to the non-volatile memory 16.

It is also possible to connect a plurality of controllers (not shown) to the slots 7A, 7B, thereby enabling a plurality of users to play competitive games against one each at the same time.

A portable electronic device used as a slave with respect to information equipment such as a video game station has recently been considered. Such a novel portable electronic device is inserted into the slots 7A, 7B of the video game station 1 in a manner the same as that of the memory card 10 described above, with the necessary data being downloaded to the device and then used. After the data is downloaded, the device is extracted from the video game station and can be used as a hand-held game machine.

A characteristic of various well-known portable electronic devices, to say nothing of such a novel portable electronic device, is that they are susceptible to moisture and dust because they accommodate electronic circuitry. Accordingly, it is undesirable to carry these portable electronic devices out of doors on rainy or snowy days, to locations where there is the danger of exposure to water, such as the sea, rivers and baths, and to recreation grounds where dust tends to blow about.

However, users desire to carry these devices about even on rainy and snowy days, and there are not a few users who find restrictions on place of use unsatisfactory.

The present invention, which has been devised in view of these circumstances, has as its object to protect a portable electronic device against moisture and dust so that the device can be carried anywhere.

DISCLOSURE OF THE INVENTION

In order to solve the foregoing problem, a protective case according to the present invention has an upper case and a lower case which, by being abutted against each other in order to accommodate a portable electronic device having a manipulator that is operated by being pushed, form a closed space in the interior of which the portable electronic device is capable of being accommodated.

Provided in at least one of the cases is a through-hole at a position opposing the operating element of the portable electronic device accommodated inside the space. The through-hole is closed by a closure member comprising an elastic material and having a push-button that is capable of pushing the operating element of the portable electronic device from the outside. As a result, the operating element of the portable electronic device is capable of being operated externally.

Furthermore, the abutting portion of each case is sealed by a sealing member comprising an elastic material, whereby moisture and dust are positively prevented from penetrating the interior.

By integrally forming the closure member and the sealing member as a continuum, the number of component parts and the number of assembly steps can be reduced and manufacture can be simplified.

In an instance where the accommodated portable electronic device has a display section, it is preferred that an area of the case that opposes the display section of the portable electronic device when the portable electronic device is in the accommodated state be formed in the shape of a concave lens. As a result, it is possible to view the display section of the portable electronic device from the outside in magnified form.

BEST MODE FOR CARRYING OUT THE INVENTION

A preferred embodiment according to the present invention will now be described with reference to the drawings.

A portable electronic device accommodated in a protective case embodying the present invention is used as the slave of an entertainment system such as a video game station serving as the master. The portable electronic device can be used as the memory card of the master and can be employed separately as a hand-held game machine as well.

It should be noted that the master is not limited to a video game station and that the portable electronic device serving as the slave need not necessarily have a memory card function.

In the description that follows, the present invention is described in regard to a video game station serving as a master.

Figure 1:
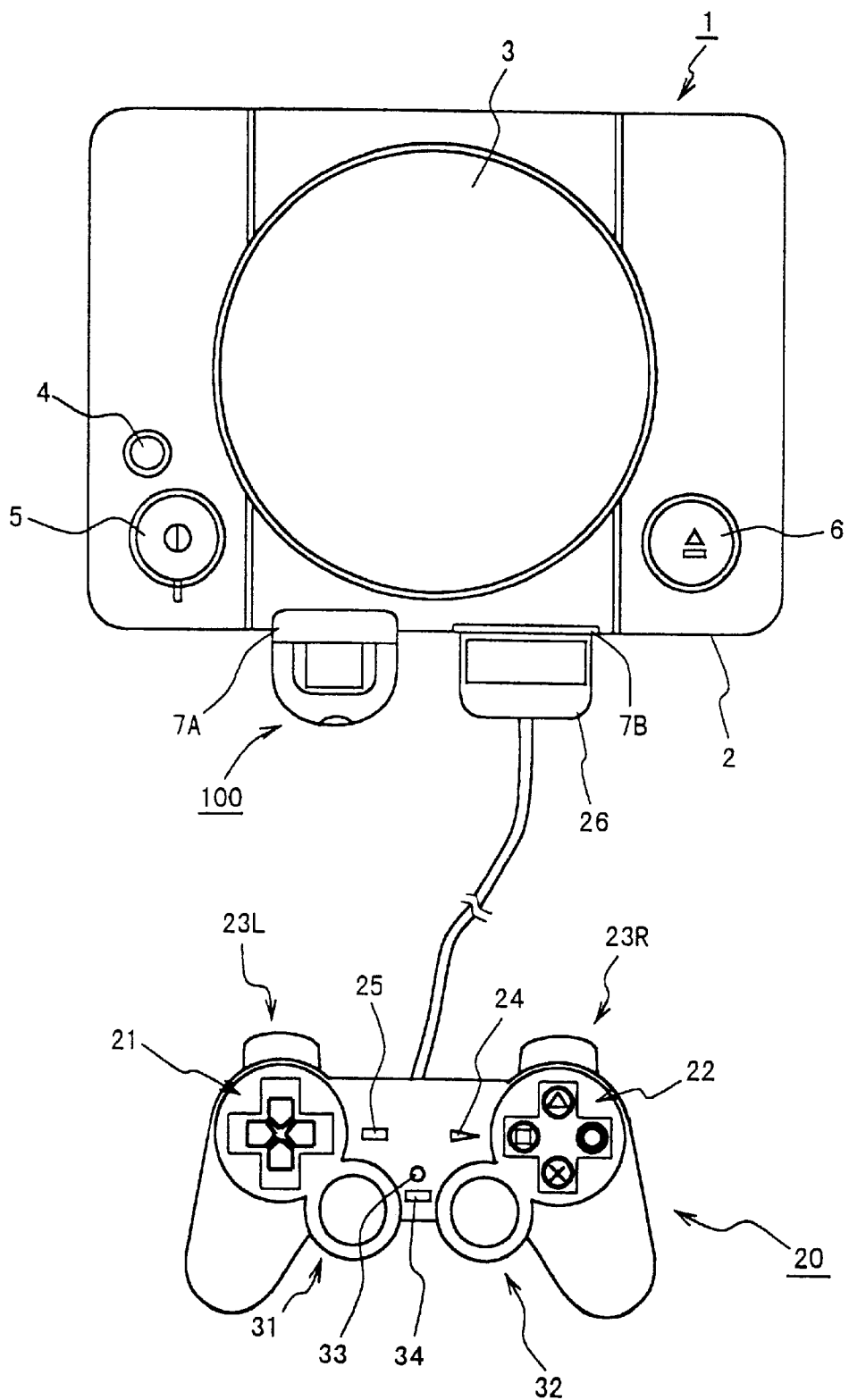
FIG. 1 is a plan view illustrating the appearance of a video game station according to an embodiment of the present invention.

FIG. 1 is a plan view showing the appearance of a video game station serving as the master.

The video game station 1 is for reading out a game program that has been recorded on an optical disk or the like and for executing the program in accordance with commands from a user (the player of the game). Executing the game primarily means causing the game to proceed and controlling video and audio that conform to the content of the game.

The video game station 1 has a console 2 accommodated within a substantially quadrangular case, and a centrally provided disk mounting unit 3. An optical disk serving as a recording medium on which the application program of the video game has been recorded is mounted on the disk mounting unit 3. The console 2 is provided with reset switch 4 for resetting the game at will, a power-supply switch 5, a disk operating switch 6 used when mounting the optical disk on and demounting it from the disk mounting unit 3, and two slots 7A and 7B, by way of example.

It should be noted that the recording medium for supplying the application program is not limited to an optical disk. Further, an arrangement may be adopted in which the application program is supplied via a communications line.

Two controllers 20 can be connected to the slots 7A, 7B so that two users can play competitive games or the like against each other. The above-mentioned memory card or the portable electronic device embodying the present invention can be inserted into the slots 7A, 7B. Though FIG. 1 exemplifies a structure provided with the two slots 7A, 7B, the number thereof is not limited to two.

The controller 20 has first and second control portions 21, 22 as well as a left button 23L, a right button 23R, a start button 24 and a select button 25. The controller further has control portions 31, 32 capable of analog control, a mode selection switch 33 for selecting the operating mode of the control portions 31, 32, and a display portion 34 for displaying the selected operating mode. Provided within the controller 20 is a vibration imparting mechanism, which is not shown.

Figure 2:
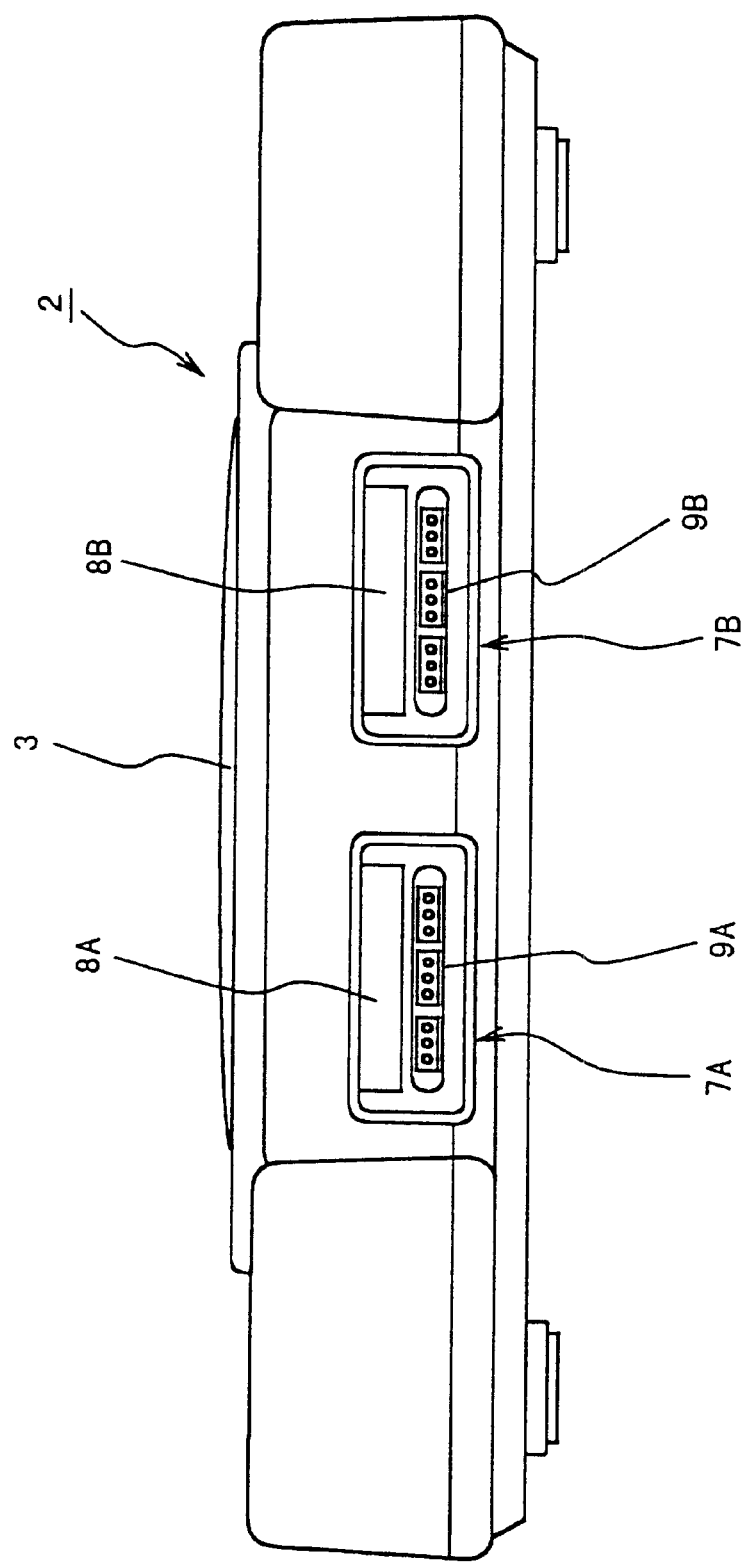
FIG. 2 is a back view showing the appearance of slots in the video game station.

FIG. 2 shows the appearance of the slots 7A, 7B provided in the front side of the console 2 of video game station 1.

According to this embodiment, the slots 7A, 7B have the following components on two levels, one above the other: Specifically, the upper levels of the respective slots are provided with memory card insertion portions 8A, 8B for inserting the above-mentioned memory card 10 or a portable electronic device 100, described later, and the lower levels of the respective slots are provided with controller connecting portions jacks) 9A, 9B for connecting a connection terminal (connector) 26 of the controller 20.

Structurally, the insertion hole (slot) of each of the memory card insertion portions 8A, 8B is formed to have a transversely elongated rectangular shape, and the corners at both ends on the lower side thereof are made rounder than the corners at both ends on the upper side so that a memory card cannot be inserted in the wrong direction. Shutters for protecting the connection terminals provided within the memory card insertion portions 8A, 8B are reclosably provided in the openings to the memory card insertion portions.

Structurally, the controller connecting portions 9A, 9B, on the other hand, each have an insertion hole of a transversely elongated rectangular shape, and the corners at both ends on the lower side thereof are made rounder than the corners at both ends on the upper side, whereby the connection terminal 26 of the controller 20 cannot be connected in the wrong direction. Furthermore, the insertion hole of each of the controller connecting portions 9A, 9B is provided with a shape different from that of the insertion holes of the memory card insertion portions 8A so that a memory card or the like will not be inserted by mistake.

Figure 3:
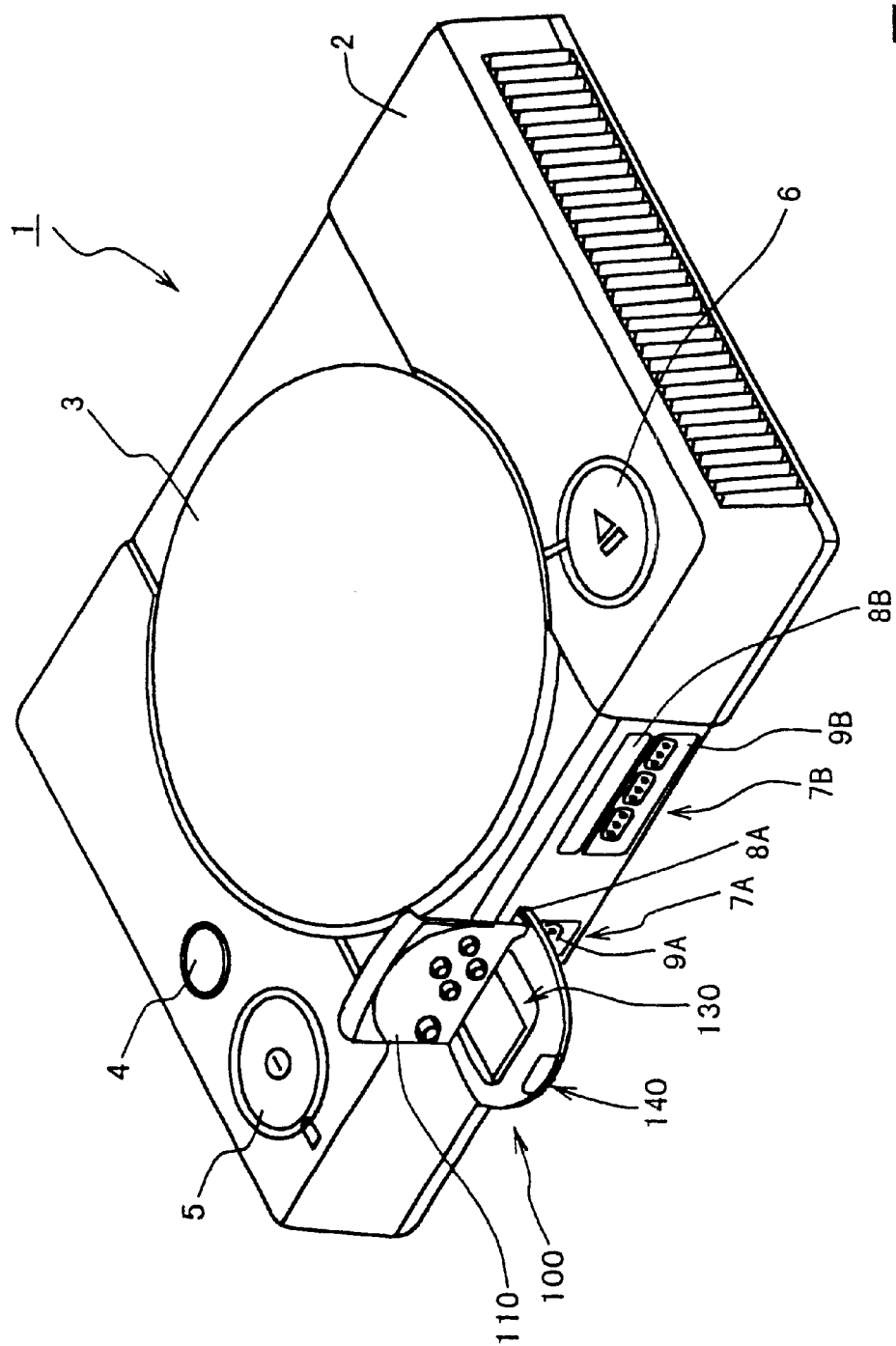
FIG. 3 is a perspective view showing the appearance of the video game station.

FIG. 3 is a diagram showing a state in which the portable electronic device 100 (described later) according to this embodiment has been inserted into the memory card insertion portion 8A of slot 7A formed in the front side of the video game station 1.

Figure 4:
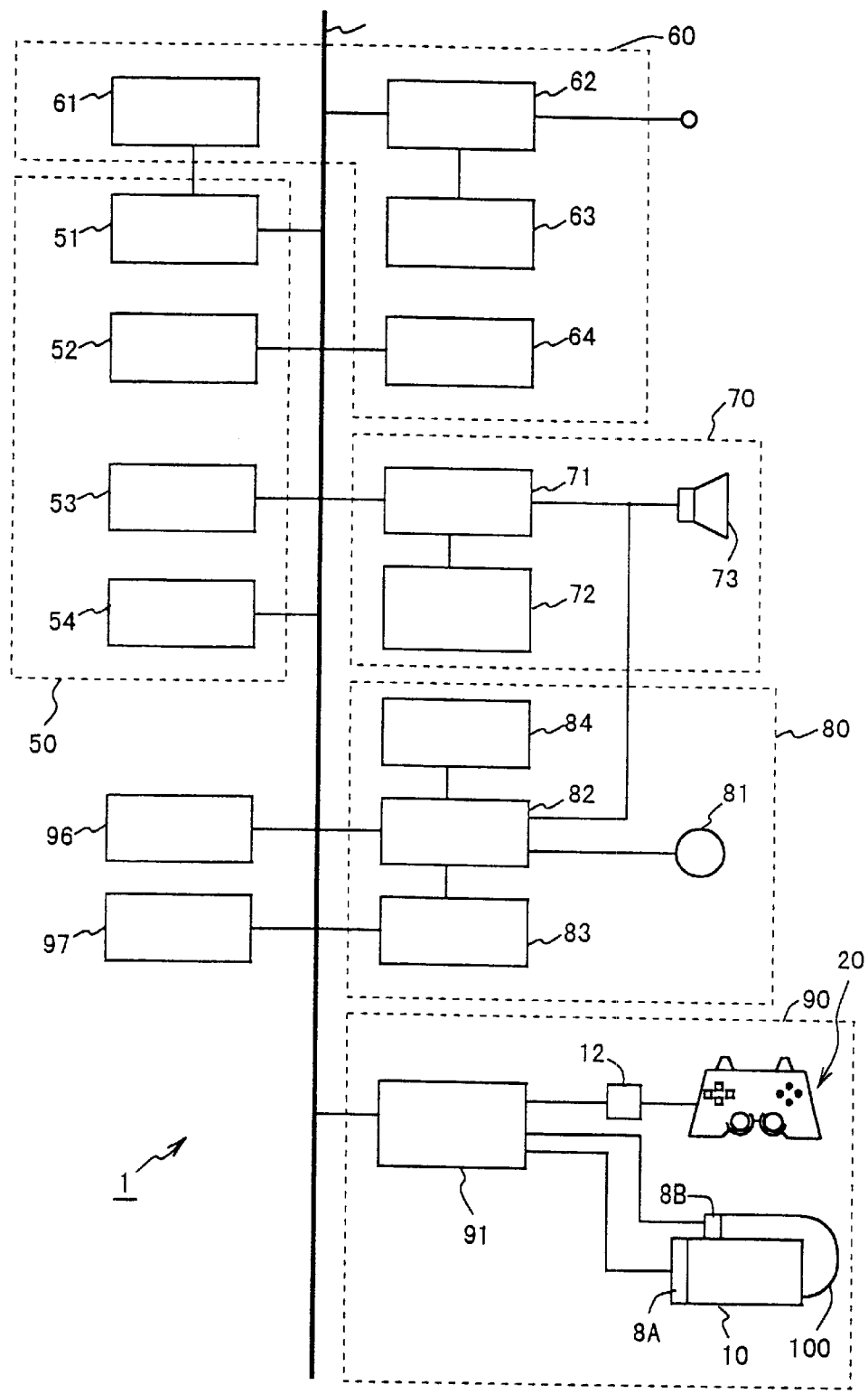
FIG. 4 is a block diagram illustrating schematically the principal components of electrical circuitry constructing the video game station.

FIG. 4 is a block diagram showing schematically the principal components of the electrical circuitry constructing the above-described video game station 1 serving as a master.

The video game station 1 has a control system 50 comprising a central processing unit (CPU) 51 and its peripherals; a graphics system 60 comprising a graphic processing unit (GPU) 62, etc., for drawing graphics in a frame buffer 63; a sound system 70 comprising a sound processing unit (SPU), etc., for generating music and sound effects, etc.; an optical-disk controller 80 for controlling an optical disk on which an application program has been recorded; a communications controller 90 for controlling input and output of data to and from the memory card 10 or portable electronic device 100, described later; and a bus denoted BUS to which each of the foregoing components is connected.

The control system 50 among these components has the CPU 51, a peripherals controller 52 for performing control such as interrupt control and control of direct memory access (DMA) transfer, a main memory 53 comprising a random-access memory (RAM); and a read-only memory (ROM) 54.

The main memory 53 mentioned here refers to a memory in which programs can be executed. A program such as a so-called operating system for controlling the main memory 53, graphics system 60 and sound system 70, etc., has been stored in the read-only memory 54.

The CPU 51, which performs overall control of the video game station 1 by executing the operating system that has been stored in the ROM 54, is constituted by a 32-bit RISC-CPU, by way of example.

When power is introduced to the video game station 1 constructed as set forth above, the CPU 51 included in the control system 50 runs the operating system stored in the ROM 54 to thereby control the graphics system 60 and sound system 70, etc.

Further, when the operating system is run, the CPU 51 initializes the video game station 1 and then controls the optical-disk controller 80 to execute an application program such as a game that has been recorded on an optical disk. On the basis of the program, the CPU 51 controls the graphics system 60 and sound system 70, etc., in conformity with user commands entered from the controller 20, thereby controlling the display of images and the generation of sound effects and music.

The graphics system 60 has a geometry transfer engine (GTE) 61 for executing coordinate transformation and the like, the GPU 62 for drawing graphics in accordance with a draw command from the CPU 51, a frame buffer 63 for storing an image drawn by the GPU 62, and an image decoder 64 for decoding image data that has been compressed and encoded by an orthogonal transformation such as a discrete cosine transformation.

The GTE 61, which has a parallel operation mechanism for executing a plurality of arithmetic operations in parallel, is capable of executing a coordinate transformation, light-source calculation and matrix or vector operation, etc., at high speed in response to an operation request from the CPU 51.

By way of example, in a calculation where one polygon of a triangular shape is rendered (subjected to flat shading) in the same color, the GTE 61 is capable of calculating the coordinates of a maximum of 1,500,000 polygons in one second. As a result, the video game station 1 is capable of reducing the load upon the CPU 51 and of calculating coordinates at high speed.

The GPU 62 draws polygons and the like in the frame buffer 63 in accordance with a draw command from the CPU 51. The GPU 62 has the ability to draw a maximum of 360,000 polygons in one second.

The frame buffer 63, which comprises a dual-port RAM, is capable of performing simultaneously the transfer of draw data from the GPU 62 or main memory and read-out for displaying what has been drawn The frame buffer 63, which has a capacity of 1 MB, is treated as a 16-bit matrix composed of 1024 pixels in the horizontal direction and 512 pixels in the vertical direction.

Further, the frame buffer 63 is provided with a CLUT area and a texture area in addition to a display area from which data is output as video. A color look-up table (CLUT) to which reference is had when the GPU 62 draws polygons or the like is stored in the CLUT area. Texture inserted into (mapped to) polygons drawn by the GPU 62 is stored in the texture area. The CLUT area and texture area change dynamically in accordance with a change, etc., in the display area.

Besides performing the flat shading mentioned above, the GPU 62 is capable of executing Gouraud shading, which decides the color in a polygon by interpolation from the colors at the apices of the polygon, and texture mapping, in which texture that has been stored in the texture area is mapped to polygons. In a case where Gouraud shading or texture mapping is carried out, the GTU 61 is capable of calculating the coordinates of a maximum of 500,000 polygons in one second.

Under control of the CPU 51, the image decoder 64 decodes image data representing still or moving images stored in the main memory 53, and stores the decoded data in the main memory 53. The image data thus reproduced is stored in the frame buffer 63 via the GPU 62, whereby the image data is capable of being used as the background of the image drawn by the GPU 62.

The sound system 70 has an SPU 71 for generating music and sound effects based upon a command from the CPU 51, a sound buffer 72 in which data such as waveform data is recorded, and a speaker 73 for outputting music and sound effects, etc., generated by the SPU 71.

The SPU 71 has an ADPCM decoding function for reproducing audio data obtained by adaptive differential PCM (ADPCM) using 16-bit audio data as a 4-bit differential signal, a reproducing function for generating sound effects and the like by reproducing waveform data that has been stored in the sound buffer 72, and a modulating function for modulating and reproducing the waveform data that has been recorded in the sound buffer 72.

Provision of these functions enables the sound system 70 to generate music and sound effects, based upon the waveform data recorded in the sound buffer 72, in response to a command from the CPU 51, thus making it possible for the sound system to be used as a so-called sampling sound source.

The optical-disk controller 80 has an optical disk device 81 for reproducing programs, data and the like that have been recorded on an optical disk, a decoder 82 for decoding programs, data and the like that have been recorded following assignment of, e.g., error correction codes (ECC) thereto, and a buffer 83 in which data from the optical disk device 81 is stored temporarily, thereby speeding up the read-out of data from the optical disk. A subordinate CPU 84 is connected to the decoder 82.

In addition to ADPCM data, so-called PCM data, which is the result of subjecting an audio signal to an analog-to-digital conversion, is an example of audio data recorded on the optical disk and read out by the optical disk device 81.

As for ADPCM data, audio data that has been recorded using four bits to express, e.g., a 16-bit digital data differential is decoded by the decoder 82, after which the decoded data is supplied to the SPU 71. Here the data is subjected to processing such as a digital/analog conversion and then is output to the speaker 73.

As for PCM data, audio data that has been recorded as, e.g., 16-bit digital data is decoded by the decoder 82 and is then output to the speaker 73.

The communications controller 90 has a communications control circuit 91 for controlling communication with the CPU 51 via the bus denoted BUS. The controller connecting portions 9A, 9B and memory card insertion portions 8A, 8B are each connected to the communications control circuit 91.

The controller 20 is connected to the controller connecting portions 9A, 9B and is provided with, say, 16 operating keys so that the user may enter operating information. In accordance with a command from the communications control circuit 91, the controller 20 transmits the states of these operating keys to the communications control circuit 91 at a cycle of 60 times per second by synchronous communication. The communications control circuit 91 transmits the sent states of the operating keys to the CPU 51. As a result, the operating information from the user is input to the CPU 51 which, on the basis of the game program, etc., currently being run, executes processing that is in accordance with the user operating information.

It is required that a large quantity of data be transferred at high speed when program read-out, image display and drawing of graphics, etc., are executed by cooperation among the main memory 53, GPU 62, image decoder 64 and decoder 82. Accordingly, the video game station 1 is so adapted that a direct transfer of data (so-called DMA transfer) can be carried out among the main memory 53, GPU 62, image decoder 64 and decoder 82 by control from the peripherals controller 52 without the intervention of the CPU 51. As a result, the load on the CPU 51 that accompanies data transfer can be alleviated and high-speed data transfer becomes possible.

When it is necessary to store setup data and the like relating to a game currently being run, the CPU 51 transmits the data that is to be stored to the communications control circuit 91. Upon receiving the data sent from the CPU 51, the communications control circuit 91 writes the data to the memory card 10 or portable electronic device 100 that has been inserted into the slot of memory card insertion portion 8A or 8B. It should be noted that the communications control circuit 91 has a built-in protection circuit to prevent electrical destruction.

The memory card 10 and portable electronic device 100, which are separate from the bus denoted BUS, can be inserted and extracted in a state in which the game station console is being supplied with power. In situations where the storage capacity of the memory card 10 or portable electronic device 100 is no longer adequate, therefore, a new memory card 10 or portable electronic device 100 can be substituted for the old without cutting off power to the console 2. This makes it possible for game data requiring power back-up to be written to the newly inserted memory card 10 or portable electronic device 100 without being lost.

A parallel I/O interface (PIO) 96 and a serial I/O interface (SIO) 97 are interfaces for connecting the memory card 10 and portable electronic device 100 to the video game station 1.

The portable electronic device embodying the present invention will be described next.

The portable electronic device 100 used as the slave of the video game station 1 (the master), described above, will be discussed.

The portable electronic device 100 serving as the slave is inserted into either of the memory card insertion portions 8A, 8B provided in the slots 7A, 7B, respectively, of the video game station 1 (master). Portable electronic devices can be used also as unique memory cards corresponding to a plurality of connected controllers 20. For example, in an instance where two users (game players) play the game, the two portable electronic devices 100 function so that the game results of the individual users can be recorded on the respective ones of the portable electronic devices.

The connector of the memory card 10 or portable electronic device 100 is so adapted that the conductor of the connection terminal for the power supply or for ground is formed to be longer than the other terminals in such a manner that the power-supply terminal or ground terminal will form an electrical connection first when the memory card 10 or portable electronic device 100 is inserted into the memory card insertion portions 8A, 8B. This is to ensure the safety and stability of electrical operation. An arrangement may be adopted in which the connection conductors of the memory card insertion portions 8A, 8B provided in the video game station 1 are formed to be longer, or in which both of the conductors are formed to be longer.

Further, the connector portions are formed to have left/right asymmetry in order to prevent the memory card 10 and portable electronic device 100 from being inserted in the wrong attitude.

Figure 5:
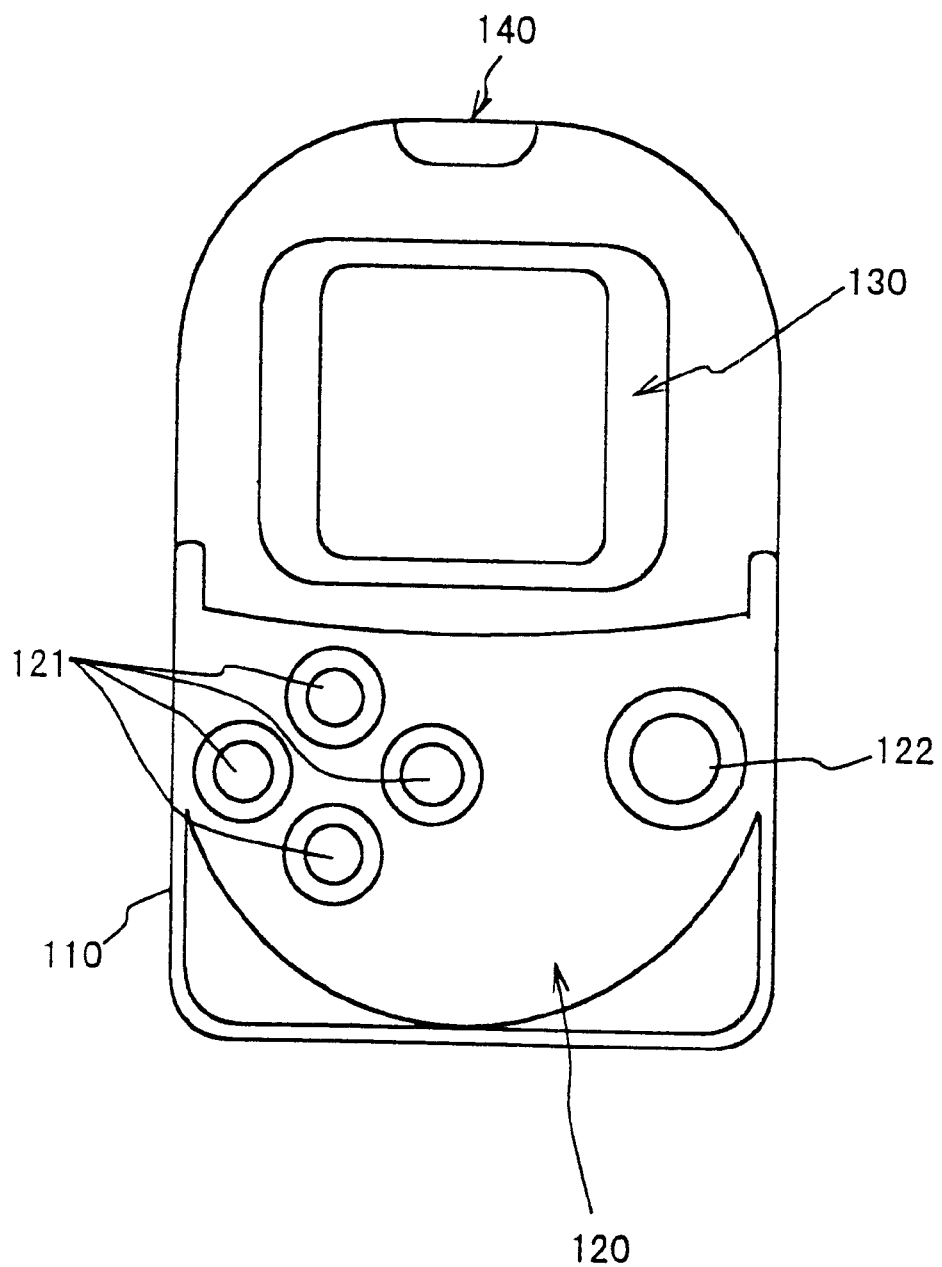
FIG. 5 is a plan view illustrating the appearance of a portable electronic device in which a portable electronic device serves as a master according to an embodiment of the present invention.
Figure 6:
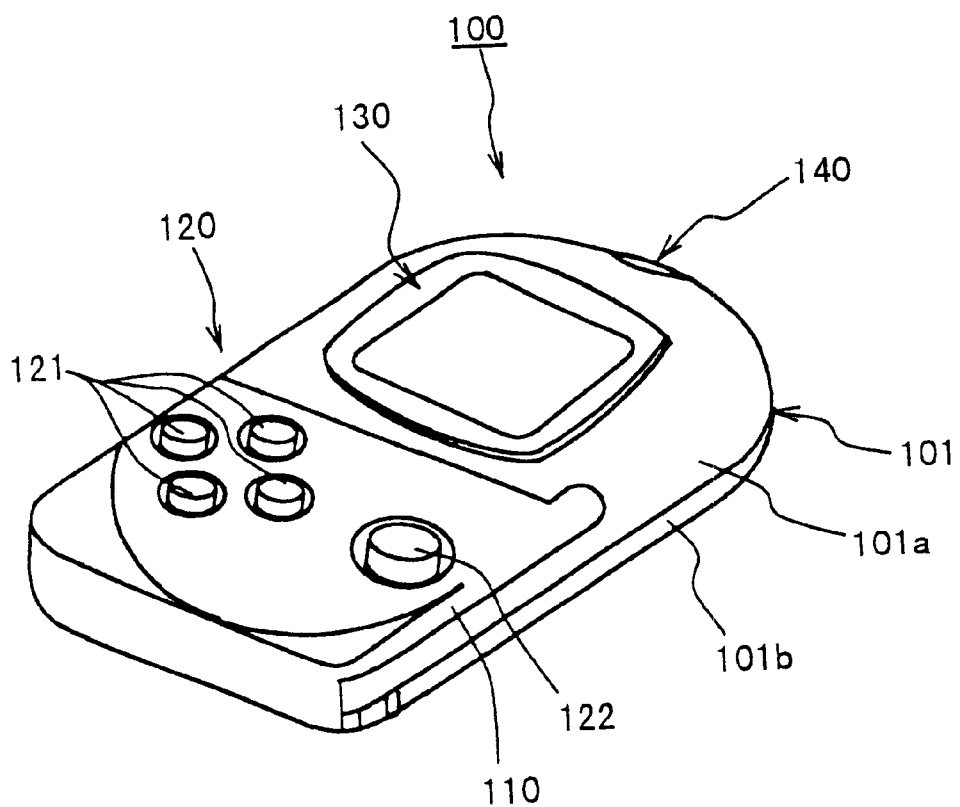
FIG. 6 is a perspective view showing the appearance of the portable electronic device.
Figure 7:
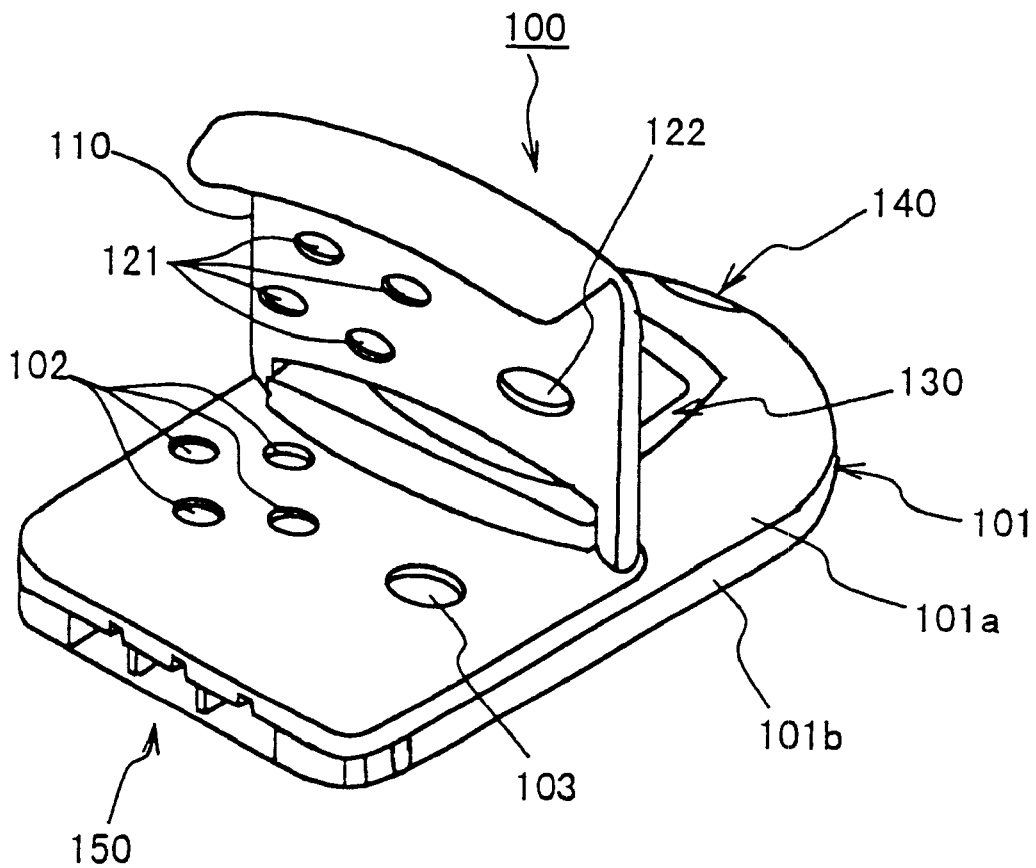
FIG. 7 is a perspective view showing the portable electronic device with a cover member opened.
Figure 8:
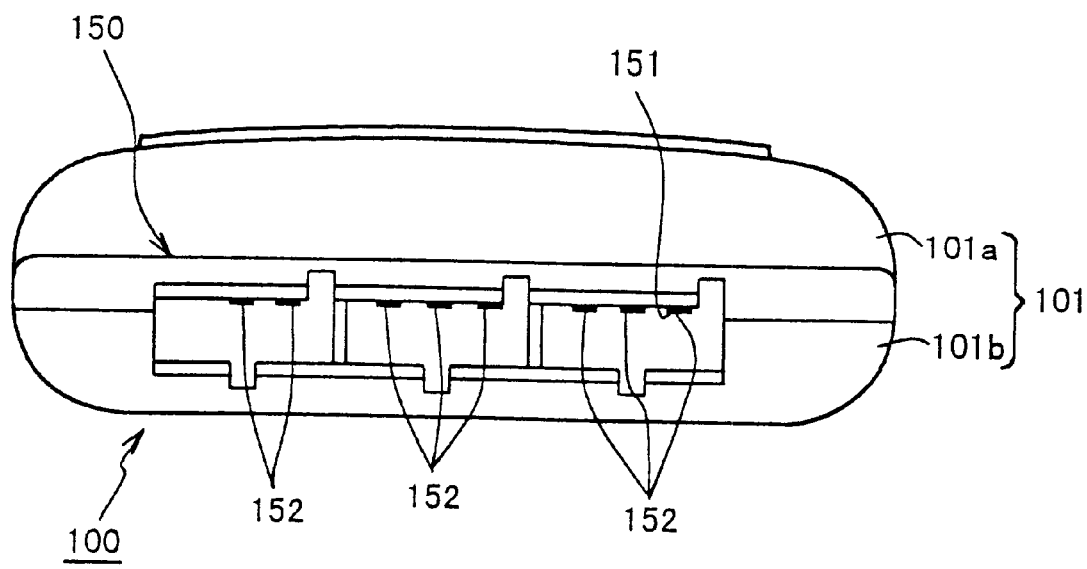
FIG. 8 is a bottom view showing the appearance of the portable electronic device.

FIGS. 5 to 8 illustrate the appearance of the portable electronic device 100, in which FIG. 5 is a plan view of the portable electronic device 100, FIG. 6 a perspective view in which a cover member 110 for protecting the connector portion is shown in the closed state, FIG. 7 a perspective view showing the cover member 110 in the open state, and FIG. 8 a bottom view of a housing 101 in a state in which the cover member 110 has been detached.

As shown in FIGS. 5 to 7, the portable electronic device 100 has a housing 101 serving as a casing. The housing 101 is provided with an operating section 120 having one or a plurality of operating elements 121, 122 for entering events and making various selections, a display section 130 comprising a liquid crystal display device (LCD), and a window 140 for performing wireless communication, as by infrared, by wireless communications means, described later.

The housing 101 comprises an upper shell 101a and a lower shell 101b and houses a substrate 151 mounting memory devices and the like (see FIG. 8). The housing 101 is capable of being inserted into the slots 7A, 7B in the console of the video game station 1, as will be described later. The base end of the housing 101 has a side face provided with a connector portion 150 having a rectangular-shaped opening.

The window 140 is provided in the generally semicircular distal end of the housing 101. The display section 130 is provided on the top side of the housing 101 in an area (an area in the vicinity of the window 140) that occupies approximately half of the top surface on the distal-end side. The operating section 120 is provided on the top side of the housing 101 in an area (an area in the vicinity of the connector portion 150) that occupies approximately half of the top surface on the base-end side.

The operating section 120 has a substantially quadrangular shape and is constituted by a cover member 110, which is pivotally supported on the housing 101 and has one or plurality of operating elements 121, 122, and switch pushers 102, 103 provided at a position opened and closed by the cover member 110 on housing 101 (see FIG. 7).

The operating elements 121, 122 are disposed passing through the cover member 110 from its upper to its lower side. The operating elements 121, 122 are supported on the cover member 110 in such fashion as to be movable in a direction in which they recede from the top side of the cover member 110.

By pushing the switch pushers 102, 103 from above, push switches such as diaphragm switches disposed on the substrate 151 in the housing 101 are pushed.

The switch pushers 102, 103 are provided at positions that oppose the operating elements 121, 122 when the cover member 110 is closed. More specifically, when the operating elements 121, 122 are pushed from above with the cover member 110 in the closed state, the pushing forces are transmitted to the corresponding push switches in the housing 101 via the opposing switch pushers 102, 103, whereby the push switches are actuated.

It should be noted that a flexible protective sheet may be affixed on the switch pushers 102, 103. By affixing the protective sheet, the pressuring elements of the switch pushers 102, 103 can be pushed directly by one's finger from above the protective sheet without the intermediary of the operating elements 121, 122. In addition, dust can be prevented from penetrating the interior of the housing 101 from the switch pushers 102, 103.

As shown in FIG. 8, power and signal terminals 152 disposed on the substrate 151 are provided inside the connector portion 150 in an exposed condition. The shape, dimensions, etc. of the connector portion 150 have specifications common with those of the ordinary memory card 10 used with the video game station 1.

Figure 9:
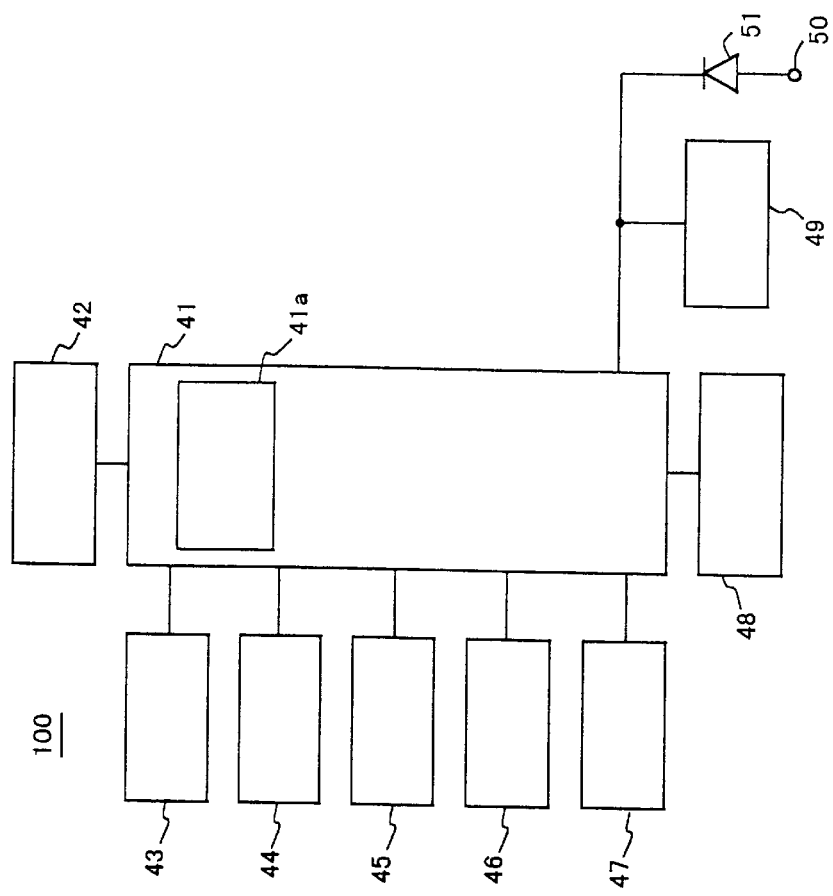
FIG. 9A is a block diagram showing an example of the arrangement of the principal components of the portable electronic device.
FIG. 9B is a diagram illustrating items controlled by controlled means shown in FIG. 9A.

FIG. 9A is a block diagram showing an example of the arrangement of the principal components of the portable electronic device.

In a manner similar to the ordinary memory card 10 described above, the portable electronic device 100 has control means 41 for controlling its operation, a connector 42 for effecting a connection to a slot of information equipment or the like, and a non-volatile memory 46 serving as a device for storing data.

The control means 41, which is constituted by, say, a microcomputer, has an internally provided program memory 41a. A semiconductor memory device such as a flash memory in which the state of recorded data remains intact even when power is cut off is used as the non-volatile memory 46. It should be noted that because the portable electronic device 100 according to the present invention is configured to be equipped with a battery 49, as will be described later, a static random-access memory (SRAM) capable of high-speed input/output of data can be used as the non-volatile memory 46.

In addition to the components mentioned above, the portable electronic device 100 has operation (event) input means 43 such as an operating button for operating a stored program, display means 44 such as a liquid crystal display device (LCD) serving as display means for displaying various information in conformity with the above-mentioned program, wireless communications means 48 for sending data to and receiving data from another memory card or the like by infrared radiation, and a battery 49 for powering each of the foregoing components.

The portable electronic device 100 internally accommodates a miniature battery 49 as power supply means. This means that the portable electronic device is capable of operating independently even if it has been pulled out of the slots 7A, 7B of the video game station 1 constituting the master. A rechargeable secondary cell may be used as the battery 49.

It is so arranged that the portable electronic device 100 serving as the slave is supplied with power from the video game station 1 serving as the master when the portable electronic device 100 has been inserted into either of the slots 7A, 7B of the video game station 1. That is, a power-supply terminal 50 is connected to the connection terminal of the battery 49 via a diode 51 for preventing reverse current. When the portable electronic device is inserted into the slot of the master, such as the video game station 1, the power-supply terminal 50 becomes connected to the power-supply terminal on the master side so that power is supplied from the master to the slave. Furthermore, in a case where a secondary cell is being used, charging of the secondary cell takes place at the same time.

The portable electronic device 100 further includes a clock 45 and a speaker 47, which serves as sound generating means for generating sound in conformity with the program. It should be noted that the above-mentioned components are all connected to the control means 41 and operate in accordance with control exercised by the control means 41.

FIG. 9B illustrates the items controlled by the control means 41. Though the only interfaces with which the ordinary memory card 10 is equipped are the interface for the connection to the console of the information equipment and the memory interface for input/output of data with respect to memory, as mentioned earlier, the portable electronic device 100 according to this embodiment has, in addition to these interfaces, a display interface, an operation-input interface, an audio interface, a wireless communications interface, a clock interface and a program-download interface.

Thus, the interfaces (drivers) for managing the functions added by the present embodiment are provided in the portable electronic device 100 independently of the console (master) connection interface and independently of non-volatile memory management, which are the conventional functions possessed by the memory card 10. For this reason compatibility with the conventional functions can be maintained.

Further, since the portable electronic device 100 has the input means 43, such as a button switch, for operating an executed program, and the display means 44 comprising the liquid crystal display device (LCD) or the like, the portable electronic device is capable of being used as a hand-held game machine.

Moreover, since the portable electronic device 100 possesses a function for storing programs and data, which are downloaded from the console of the video game station 1, in the program memory 41a in control means 41, application programs can be run on the portable electronic device 100. The stored application programs and various types of driver software can be altered with facility.

The portable electronic device 100 according to this embodiment can be controlled independently of the video game station 1, as described above. On the side of the portable electronic device 100, therefore, data based upon an application program that has been stored in the program memory 41a serving as the program storage means can be created independently of the application software on the side of the video game station 1. By exchanging this data with the video game station 1, the portable electronic device 100 constituting the slave and the video game station 1 constituting the master are capable of cooperative (linked) operation.

Furthermore, the fact that the portable electronic device 100 is equipped with the clock 45 makes it possible for time data to be shared with the video game station 1. In other words, not only is mutual time data made to coincide but both the video game station and the portable electronic device also share data that is for controlling, in real time, the progress of games that are run on them independently.

A specific example of the cooperative operation (linking) between the video game station 1 and portable electronic device 100 will be described later.

Figure 10:
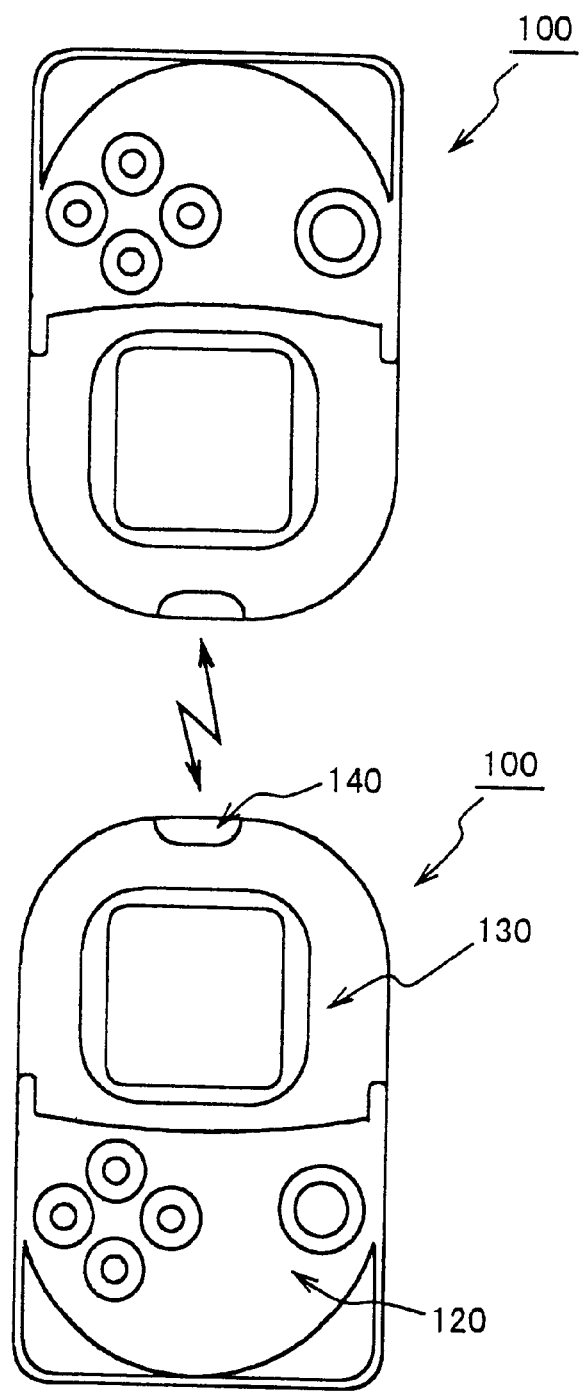
FIG. 10 is a diagram useful in describing a wireless communication function of the portable electronic device.

FIG. 10 illustrates schematically the manner in which wireless communication is performed between a plurality of the portable electronic devices 100 according to the present invention.

By thus utilizing the wireless communications means 48, the portable electronic device 100 can exchange internal data with a plurality of portable electronic devices 100 by sending and receiving data via the window 140. The internal data includes also data that has been transferred from the side of information equipment, such as the video game station, and stored in storage means within the portable electronic device 100.

In the embodiment set forth above, the portable electronic device 100 is described as being used as the slave of a video game station. However, this does not impose a limitation upon the present invention because the device can be applied also to, e.g., the retrieval of various information.

The invention will now be described in regard to cooperative operation (linking) between the portable electronic device 100 and the video game station 1 serving as the master.

As mentioned above, the portable electronic device 100 (slave) and the video game station 1 (master) can share game data generated by the control means 41, time data obtained by the clock 45, and data generated by another portable electronic device 100 and obtained via the wireless communications means 48, etc.

Figure 11:
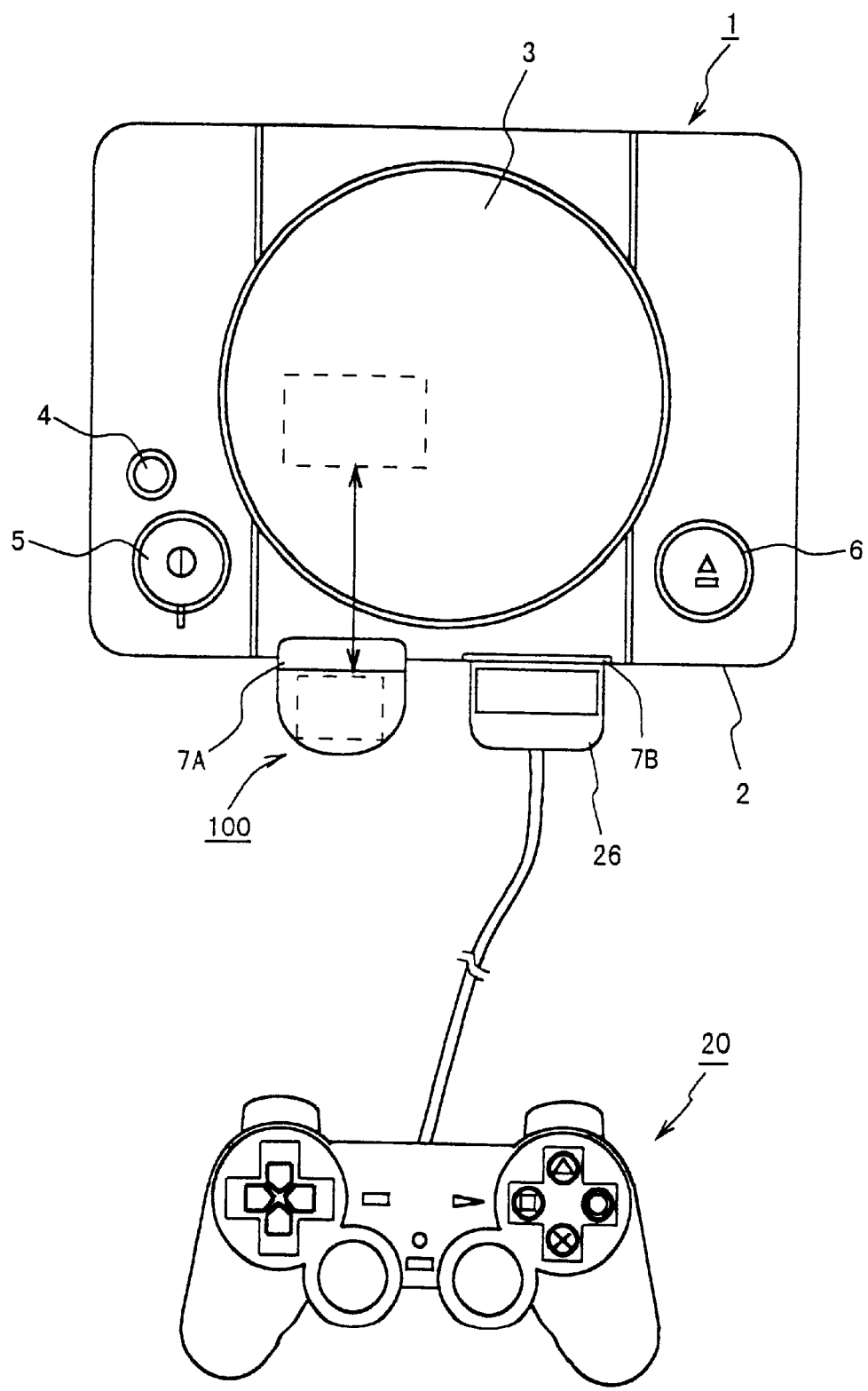
FIG. 11 is a diagram useful in describing cooperative operation between the portable electronic device and the console of the video game station.

FIG. 11 illustrates schematically the manner in which the video game station 1 serving as the master and the portable electronic device 100 serving as the slave perform a cooperative (linked) operation.

Described below as an example of such cooperative operation is a case where an optical disk (CD-ROM), which is a recording medium on which an application software program has been recorded, has been loaded in the video game station 1 serving as the master, and the program read out of the disk is downloaded to the portable electronic device 100 serving as the slave inserted into either of the slots 7A, 7B of the video game station 1.

Downloading of a program on the assumption that it is for performing a cooperative operation will be discussed before giving a specific description regarding the cooperative operation.

Figure 12:
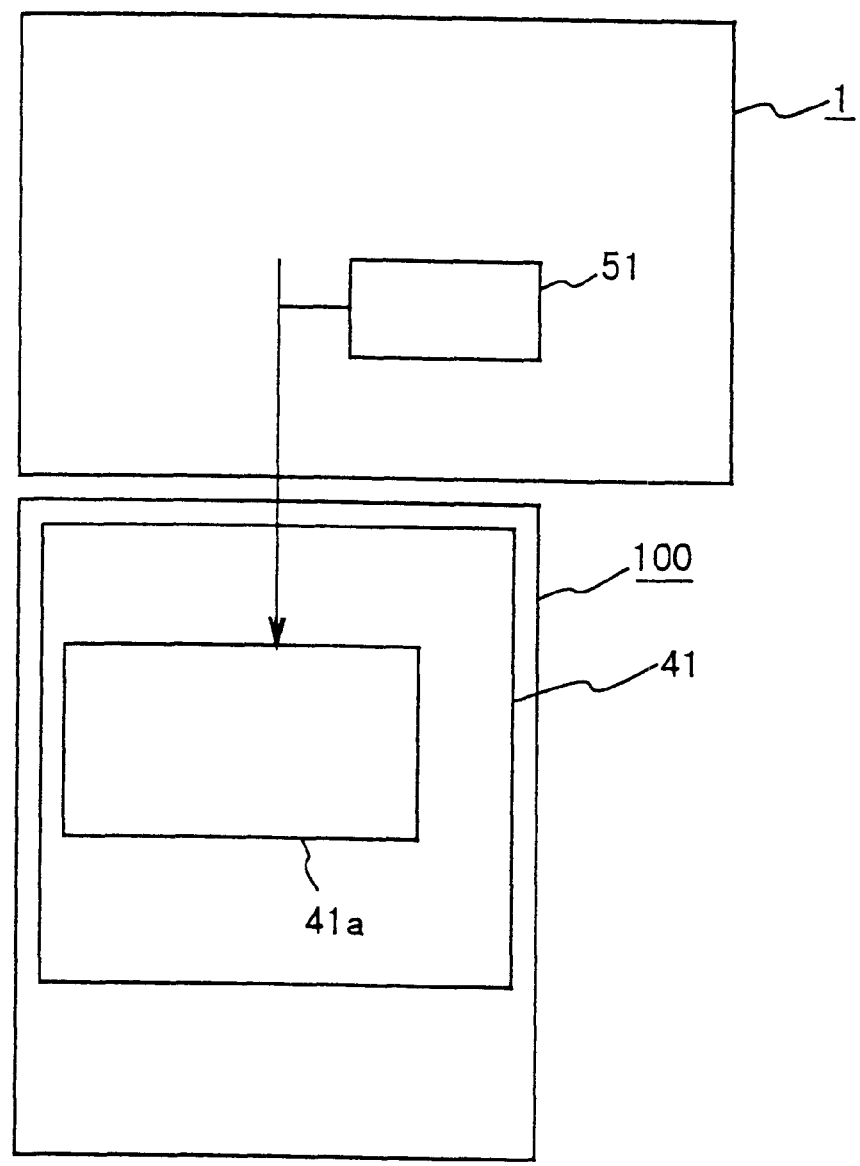
FIG. 12 is a diagram showing the flow of program data downloaded from the video game station to the portable electronic device.

FIG. 12 illustrates the flow of data in an instance where the application program of a video game supplied from an optical disk (CD-ROM), etc., mounted on the disk mounting unit 3 of the master video game station 1 is transferred directly (downloaded) to the program memory 41a in the control means (microcomputer) 41 of portable electronic device 100 via the control means (CPU) 51 of video game station 1.

Figure 13:
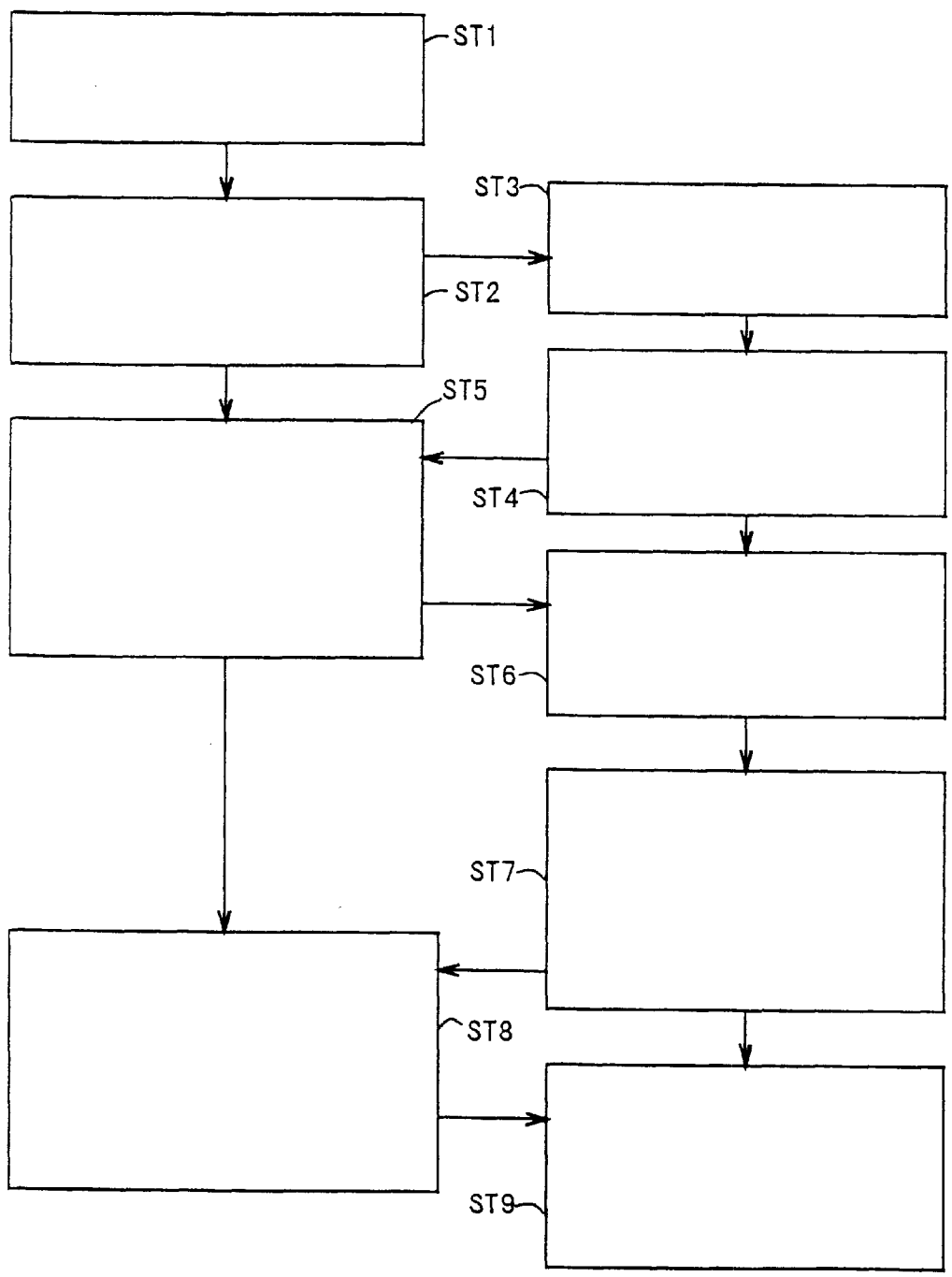
FIG. 13 is a flowchart showing the download procedure.

FIG. 13 is a flowchart illustrating the download procedure.

At step ST1, the application program of a video game that runs on the control means 41 in the slave portable electronic device 100 (referred to simply as the "slave" hereafter) is read as data out of the CD-ROM that has been mounted on the disk mounting unit 3 of the master video game station 1 (referred to simply as the "master" hereafter). As mentioned earlier, this application program generally is different from that which runs on the master video game station 1.

Next, at step ST2, the control means (CPU) 51 of the master issues a "program download request command" to the control means (microcomputer) 41 of the slave portable electronic device 100. The control means (CPU) 51 of the master performs polling in order to accept "program download permission status" from the control means (microcomputer) 41 of the slave. The polling mentioned here refers to a method of performing a service upon inquiring as to whether the service has been requested or not.

The control means (microcomputer) 41 on the slave side accepts the "program download request command" from the control means (CPU) 51 of the master at step ST3.

When the control means (microcomputer) 41 on the slave side ends the routine currently being processed and a state in which program download can be executed is attained, the control means sends "program download permission status" back to the control means (CPU) 51 of the master at step ST4.

Next, upon accepting "program download permission status" from the control means (microcomputer) 41 on the slave side at step ST5, the control means (CPU) 51 of the master transfers (downloads) and writes the program, which was read out of the CD-ROM at step ST1, to the program memory 41a of portable electronic device 100. The control means (CPU) 51 of the master performs polling in order to accept "program-start permission status" from the control means (microcomputer) 41 of the slave.

The address of the program memory 41a to which the downloaded data is written is managed by the control means (microcomputer) 41 of the slave at this time. In the description rendered above, it was assumed that the program downloaded from the master will be stored in the program memory 41a within the control means (microcomputer) 41 of the slave. However, this does not impose a limitation, for an arrangement may be adopted in which the program is stored in a storage device such as an SRAM that is capable of inputting and outputting data at high speed.

The control means (microcomputer) 41 of the slave accepts as data the program that has been transferred from the master and writes this data to the program memory 41a at step ST6. From the point of view of the control means (CPU) 51 of the master, it appears that the program data is being written directly to the program memory 41a of the slave. In addition, the address of the program memory 41a is managed by the control means (microcomputer) 41 of the slave, as set forth above.

Upon accepting the final program data from the master and then establishing an environment in which the program can be executed, the control means (microcomputer) 41 of the slave portable electronic device 100 sends "program-start permission status" back to the control means (CPU) 51 of the master at step ST7.

The control means (CPU) 51 of the master accepts "program-start permission status" from the control means (microcomputer) 41 of the slave and issues a "program-start command" at step ST8.

Upon receiving the "program-start command" from the control means (CPU) 51 of the master, the control means (microcomputer) 41 of the slave starts running the program from a predetermined starting address.

By way of the foregoing procedure, the application program is transferred directly (downloaded) from the master video game station 1 to the program memory 41a in the control means (microcomputer) 41 of the slave (portable electronic device 100) that has been inserted.

As mentioned above, the means which supplies the application program is not limited to a storage medium such as the optical disk, and an arrangement in which it is supplied via a communication line may be adopted. Only step ST1 would differ in the above-described procedure in such case.

It should be noted that the foregoing download procedure is for a case where the application program is downloaded directly from the master (video game station 1) to the program memory 41a in the control means (microcomputer) 41 of the slave (portable electronic device 100) that has been inserted.

By contrast, there is also a case where the control means (CPU) 51 of the master downloads the data of an application program to the non-volatile memory 46 in the slave (portable electronic device 100), after which this data is copied to the program memory 41a in the control means (microcomputer) 41, where the program is then executed.

Figure 14:
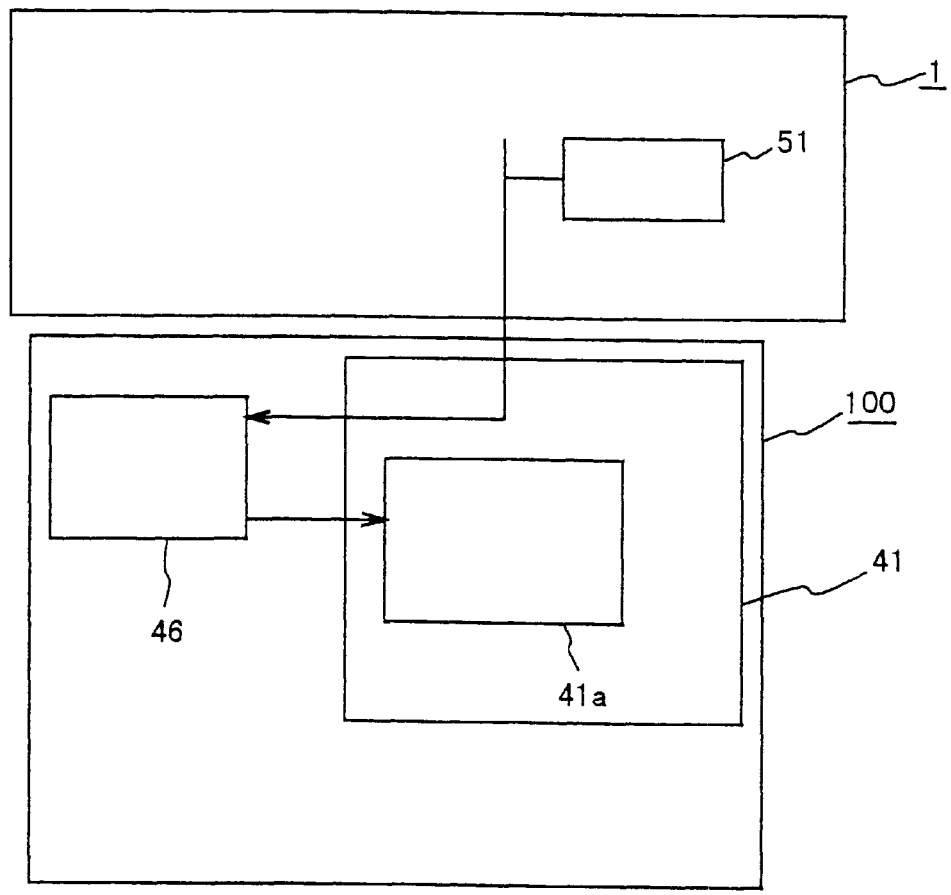
FIG. 14 is a diagram showing another flow of program data from the video game station to the portable electronic device.

FIG. 14 illustrates the flow of data in such case. Specifically, the application program of a video game supplied from an optical disk or the like mounted on the disk mounting unit 3 of the master (video game station 1) is transferred (downloaded) to the non-volatile memory 46 in the slave (portable electronic device 100) via the control means (CPU) 51 of the master, after which the program is copied to the program memory 41a in the control means (microcomputer) 41 and executed.

Figure 15:
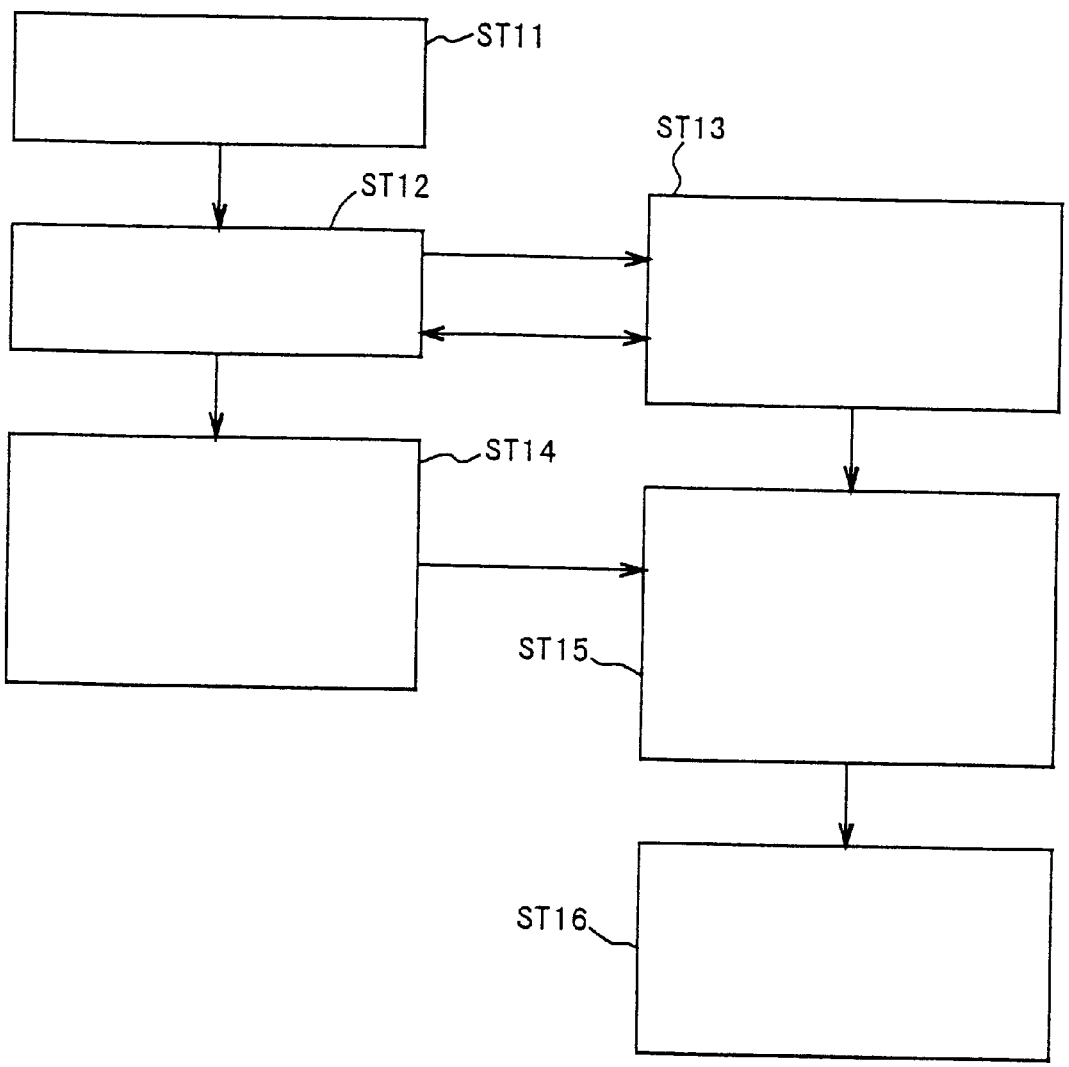
FIG. 15 is a flowchart showing the procedure of the download depicted in FIG. 14.
Figure 16A:
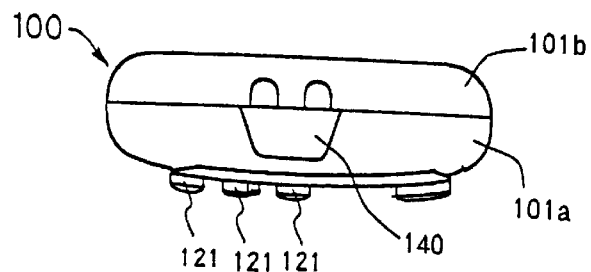
FIG. 16A is a plan view showing the appearance of the portable electronic device.
Figure 16B:
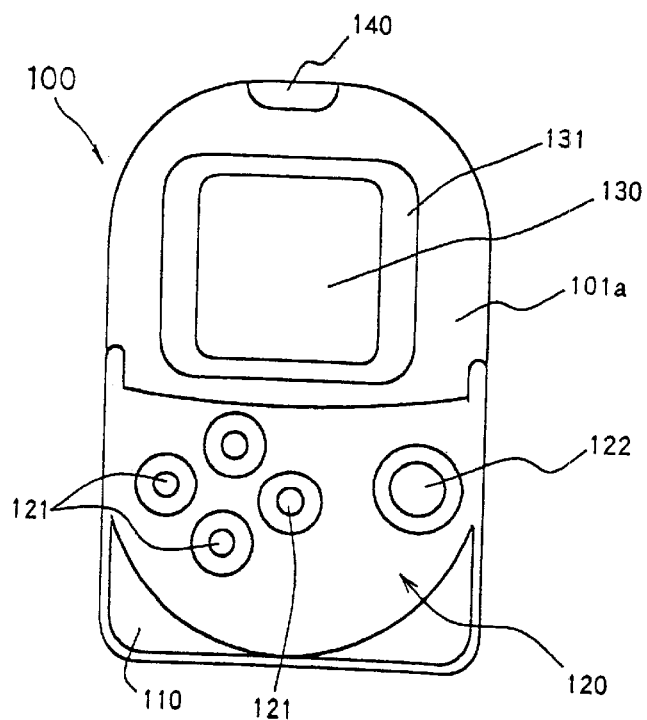
FIG. 16B is a front view showing the appearance of the portable electronic device.
Figure 16C:
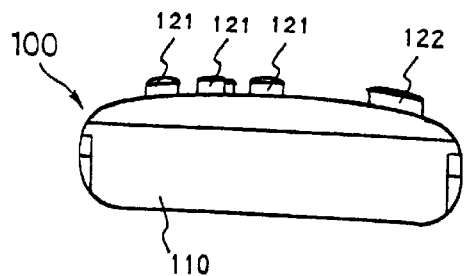
FIG. 16C is a bottom view showing the appearance of the portable electronic device.
Figure 17:
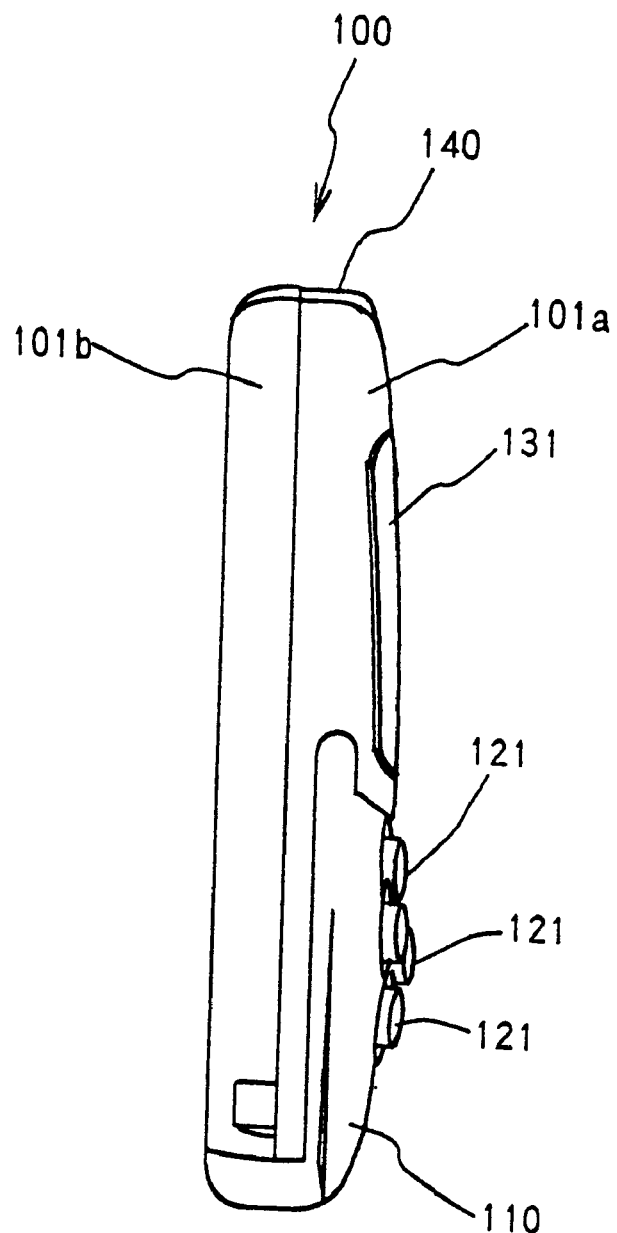
FIG. 17 is a right-side view showing the appearance of the portable electronic device.
Figure 18:
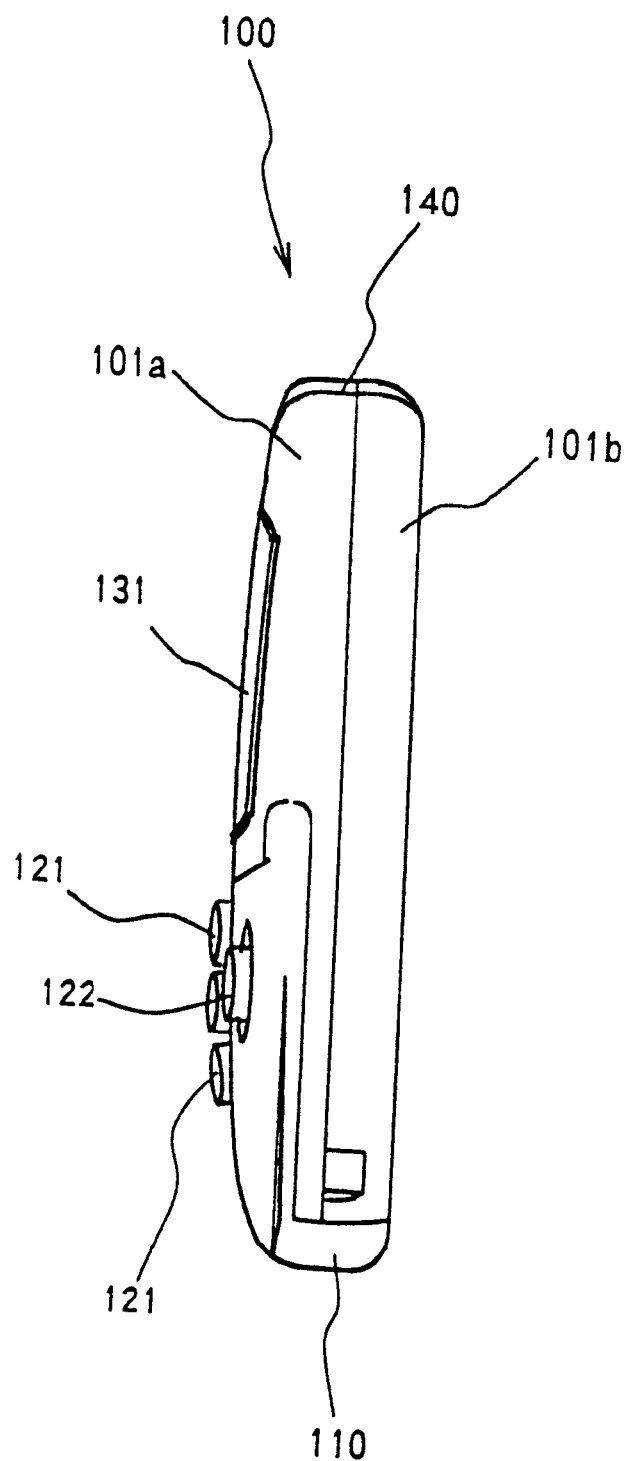
FIG. 18 is a left-side view showing the appearance of the portable electronic device.

FIG. 15 is a flowchart illustrating the download procedure.

At step ST11, the application program of a video game that runs on the control means (microcomputer) 41 in the slave (portable electronic device 100) is read as data out of the CD-ROM that has been mounted on the disk mounting unit 3 of the master (video game station 1).

Next, at step ST12, the control means (CPU) 51 of the master transfers (downloads) the program data read out of the CD-ROM to the non-volatile memory 46 of the slave. This procedure is similar to that of the case where data is backed up in the conventional video game station.

Next, at step ST13, through a procedure similar to that of the conventional data backup, the control means (microcomputer) 41 of the slave accepts as data the application program that has been transferred from the control means (CPU) 51 of the master and writes this data to the non-volatile memory 46.

This is followed by step ST14 where, upon receiving a "program-start request command" from the control means (CPU) 51 of the master, the control means (microcomputer) 41 of the slave copies data of a designated size from an address of the non-volatile memory 46 designated by the above-mentioned command to the program memory 41a in the control means (microcomputer) 41 of the slave.

The control means (microcomputer) 41 of the slave executes the program, which was copied to the program memory 41a, from the starting address of this memory.

By way of the foregoing procedure, the program of the application software is transferred (downloaded) as data, via the non-volatile memory 46, from the master video game station 1 to the program memory 41a in the control means (microcomputer) 41 of the slave (portable electronic device 100) that has been inserted.

It should be noted that the application program downloaded from the video game station 1 to the portable electronic device 100 generally is different from that which runs on the master video game station 1. Of course, the above-mentioned downloaded application program may be one that runs on both the video game station 1 and the portable electronic device 100. In such case, however, a constraint imposed is that the control means (CPU) 51 on the side of the video game station 1 and the control means (microcomputer) 41 on the side of the portable electronic device 100 be identical processors.

Described next will be cooperative operation (linkage) performed while the application software that has been downloaded from the master video game station 1 through the foregoing procedure is executed in the slave portable electronic device 100 independently and the result of execution is again exchanged with the video game station 1.

Here attribute data of personages or characters that appear in a so-called role-playing game that runs on the video game station 1 of the master is downloaded to the portable electronic device 100 of the slave. The attribute data is data that represents extent of growth, personality, etc.

By nurturing the appearing personages or characters in the program executed by the control means (microcomputer) 41 within the slave portable electronic device 100, the attributes thereof are caused to change independently of the program executed by the video game station 1.

The portable electronic device 100 embodying the present invention is configured so as to operate independently and, moreover, is small in size and convenient to carry about. As a result, the personages and characters that make an appearance owing to the program run on the portable electronic device 100 can be carried about and nurtured by the user (the player of the game) at any time. The attributes of the appearing personages and characters nurtured under the care of the user can also be transferred (uploaded) from the portable electronic device 100 to the video game station 1 by the user. In this case the appearing personages and characters whose attributes have been changed can be incorporated in the program being run on the master video game station 1 and made to act in the program.

Thus, as described above, it is possible to implement a video game in which cooperative operation can be carried out by sharing the attribute data of personages and the like with both the video game station 1 constituting the master and portable electronic device 100 constituting the slave and by causing the attribute to change in each of these devices The structure of the components making up the above-described portable electronic device 100 will now be described in greater detail.

The portable electronic device 100 is accommodated in the housing 101 and has the terminals 152 for connection to external equipment (see FIG. 8), as mentioned above. The terminals 152 are exposed within the connector portion 150 provided in the housing 101. The connector portion 150 is protected by being covered by the cover member 110, as shown in FIGS. 16A to 18.

The cover member 110 is pivotally supported by the housing 101 between a closed state, in which it covers the terminals 152, and an open state, in which it exposes the terminals 152 to the outside.

Figure 20:
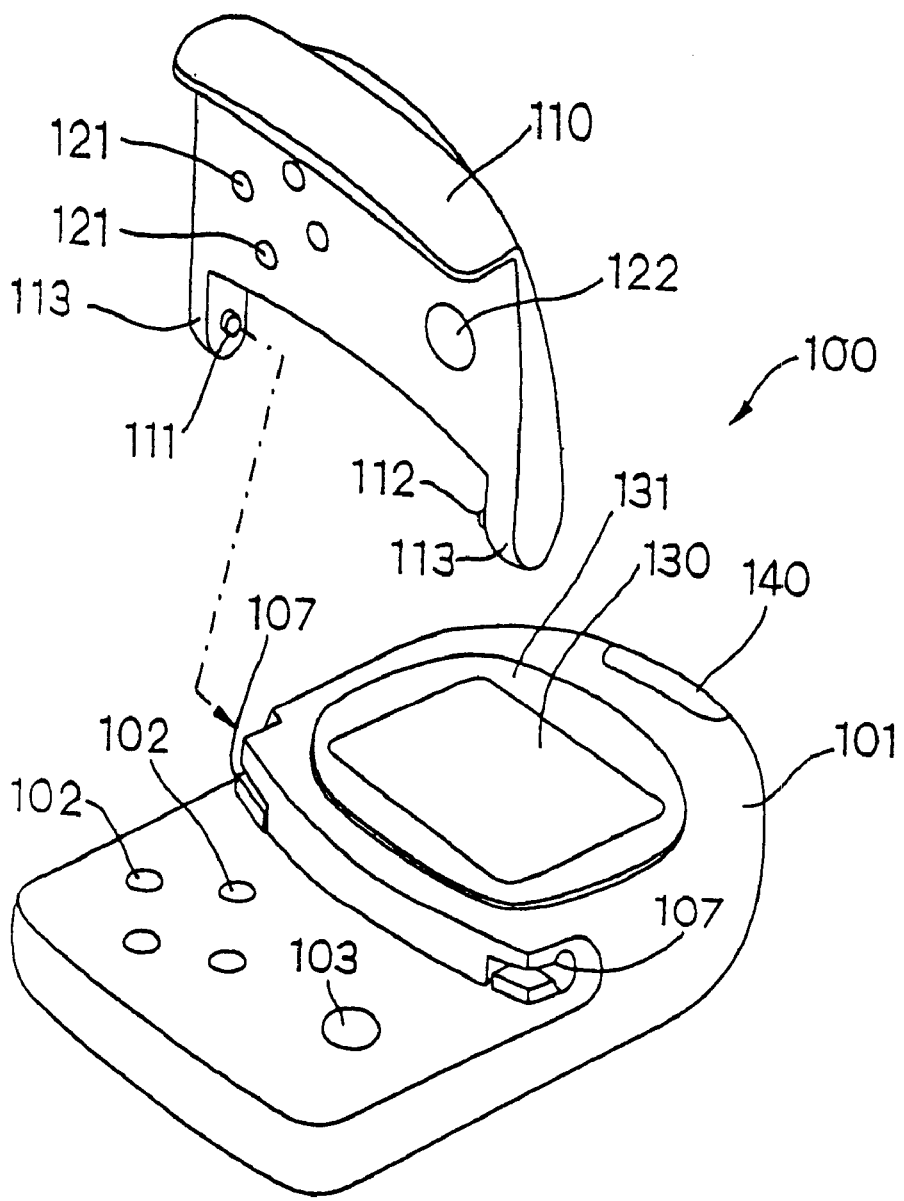
FIG. 20 is a perspective view showing the portable electronic device with the cover member detached.

More specifically, as shown in FIG. 20, the cover member 110 has two arms 113, 113, the two arms 113, 113 have opposing support pins 111, 112, and the support pins 111, 112 are fitted (see FIG. 21) into two support holes 107, 107 provided in the top of the housing 101 on both sides thereof substantially at its central portion, whereby the cover member 110 is pivotally supported.

The housing 101 is provided with the pushers 102, 103 which, by being pushed, push the push switches 157 disposed on the substrate 151 and connected to electronic circuitry, as described earlier.

Figure 29:
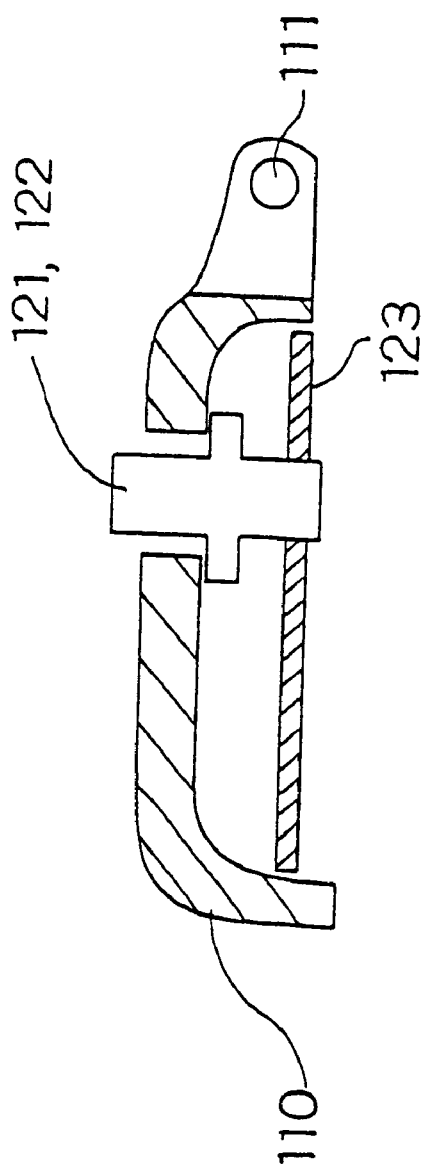
FIG. 29 is a sectional view showing an operating element provided on the cover member of the portable electronic device.
Figure 30:
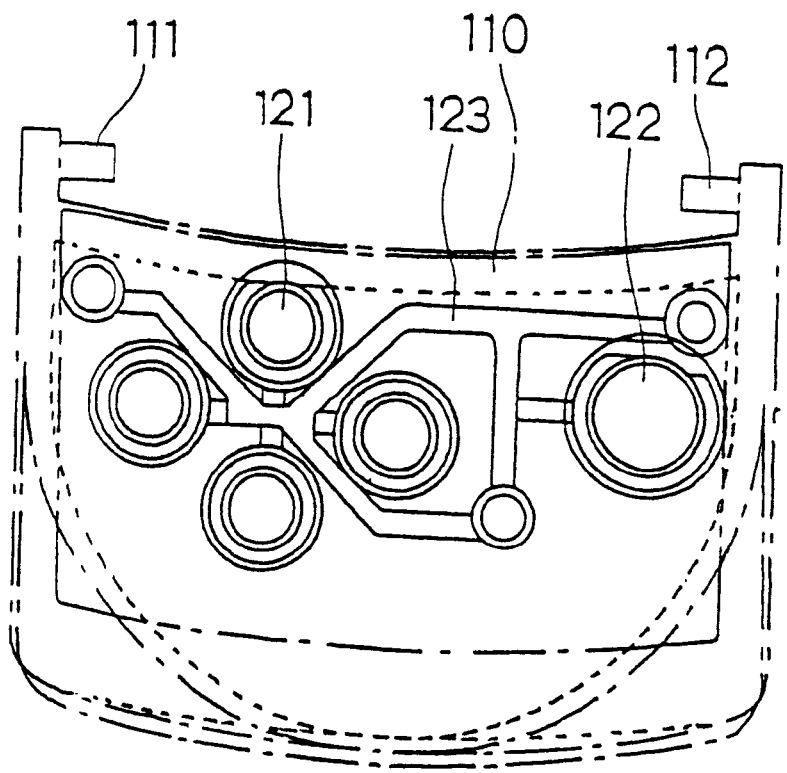
FIG. 30 is a plan view showing operating elements provided on the cover member of the portable electronic device.

As shown in FIG. 29, the cover member 110 is provided with the operating elements 121, 122 movably supported by the cover member 110 in a state in which the operating elements penetrate the cover member 110. As shown in FIG. 30, the operating elements 121, 122, which are molded as an integral part of runners 123 formed of a flexible material such as a synthetic resin, are capable of moving elastically using the resiliency of the runners 123.

Figure 31:
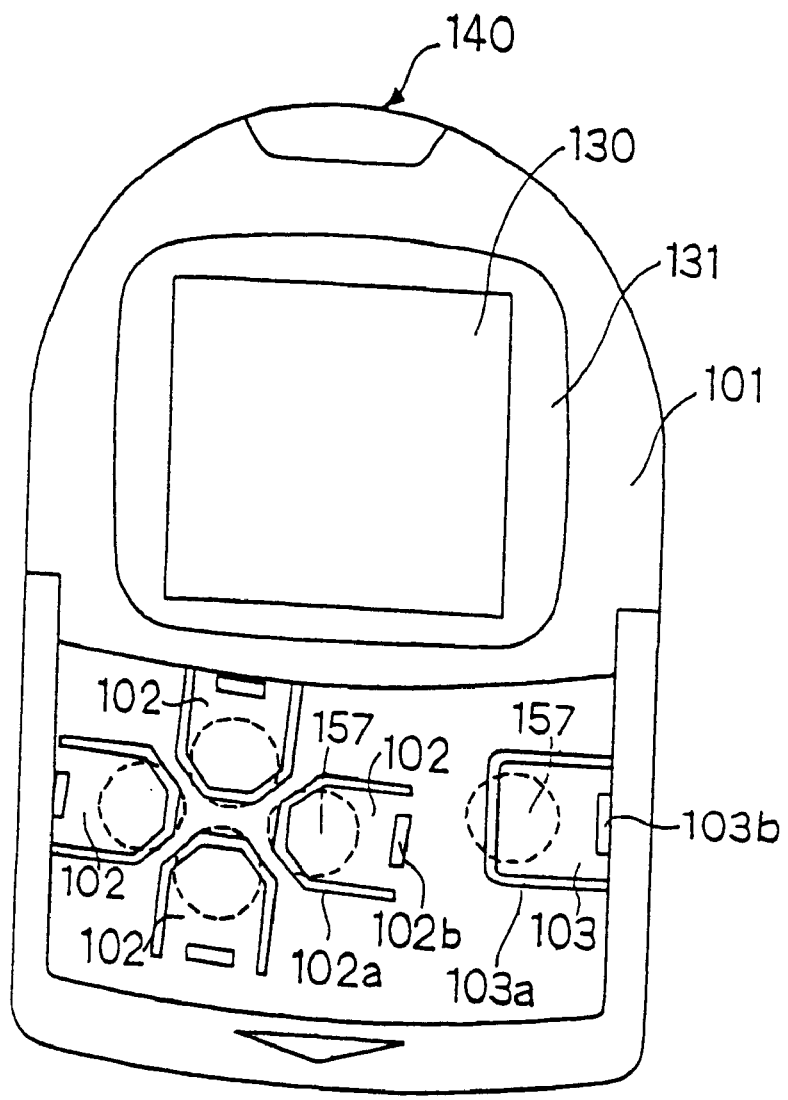
FIG. 31 is a plan view showing another mode of pushers in the portable electronic device.
Figure 32:
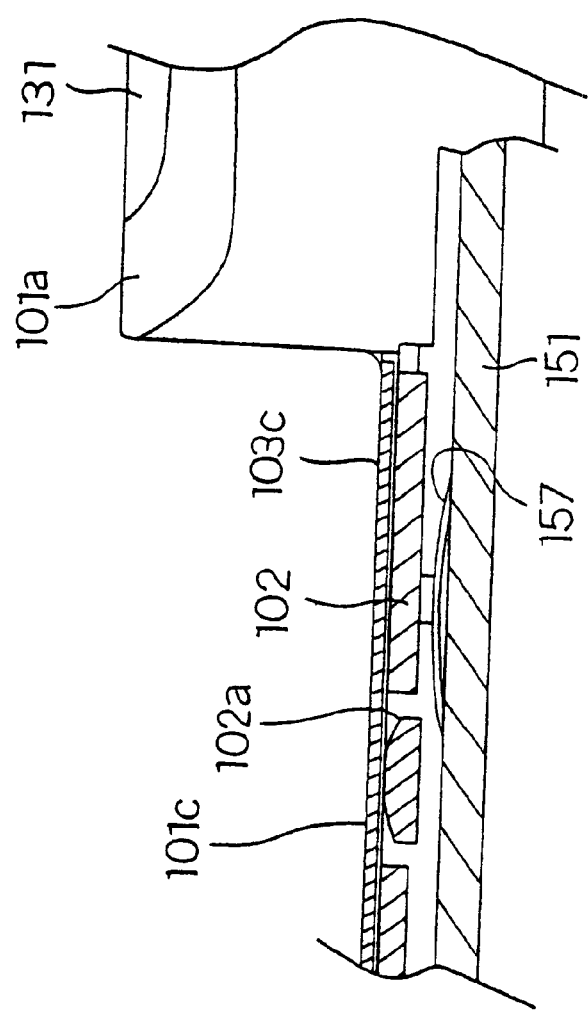
FIG. 32 is a sectional view showing another mode of pushers in the portable electronic device.

The pushers 102, 103 may be formed separate from the housing 101 or, as shown in FIGS. 31 and 32, they may be constructed from part of the shell of housing 101. In the latter case, the portions defined by cuts 102a, 103a provided in the shell of the housing 101 would constitute the switch pushers 102, 103. Slits 102b, 103b are provided on the base-end sides of the switch pushers 102, 103 so that the switch pushers 102, 103 are capable of resilient displacement relative to the housing 101. A flexible protective sheet 101c is affixed to the top side of the portion where the switch pushers 102, 103 are constructed. By affixing the protective sheet, the switch pushers 102, 103 can be pushed directly by one's finger from above the protective sheet without the intermediary of the operating elements 121, 122, and dust is prevented from penetrating the interior of the housing 101 from the switch pushers 102, 103. The housing 101 is so adapted that when the cover member 110 has been opened, the portion that includes the connector 150 is fitted into either of the slots 7A, 7B, which are recessed holding portions of the external equipment, so that the terminals 152 are made to connect with the external equipment as shown in FIG. 3.

Figure 21:
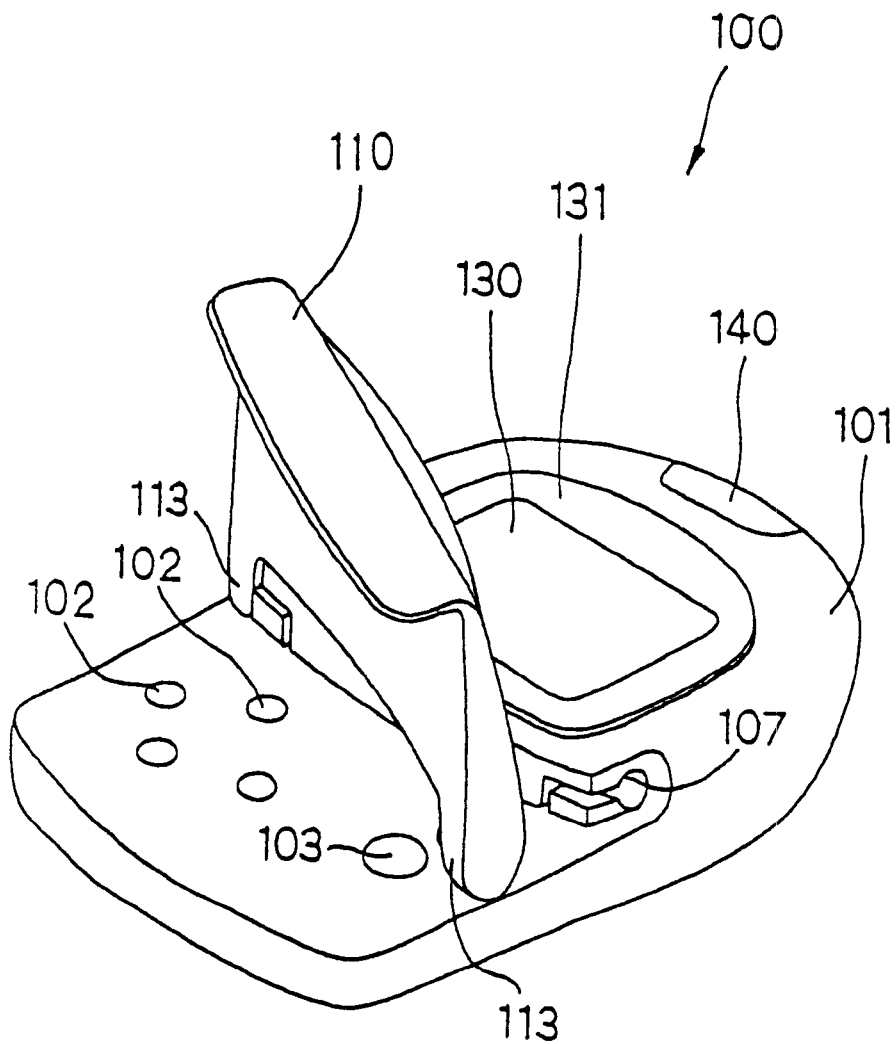
FIG. 21 is a perspective view showing the process through which the cover member is detached from the portable electronic device.
Figure 22:
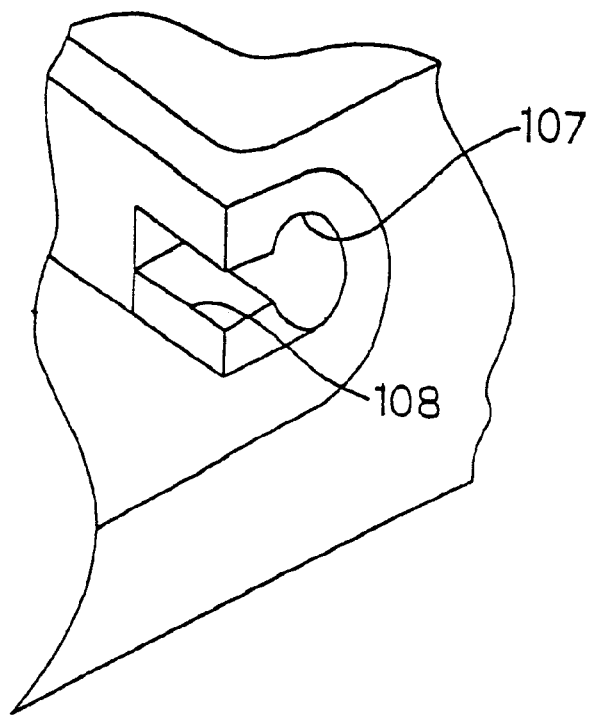
FIG. 22 is a perspective view showing, in enlarged form, a portion of the portable electronic device that supports the cover member.
Figure 23:
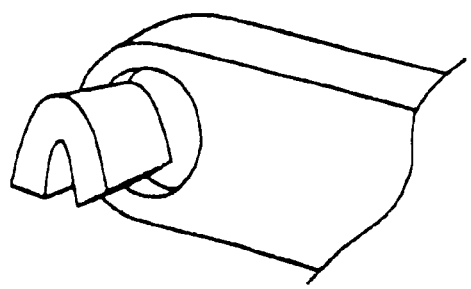
FIG. 23 is a perspective view showing, in enlarged form, a support pin of the cover member in the portable electronic device.
Figure 24:
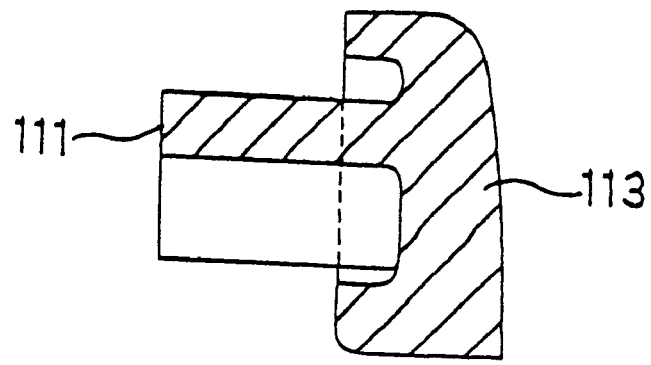
FIG. 24 is a sectional view showing, in enlarged form, the support pin of the cover member in the portable electronic device.
Figure 25:
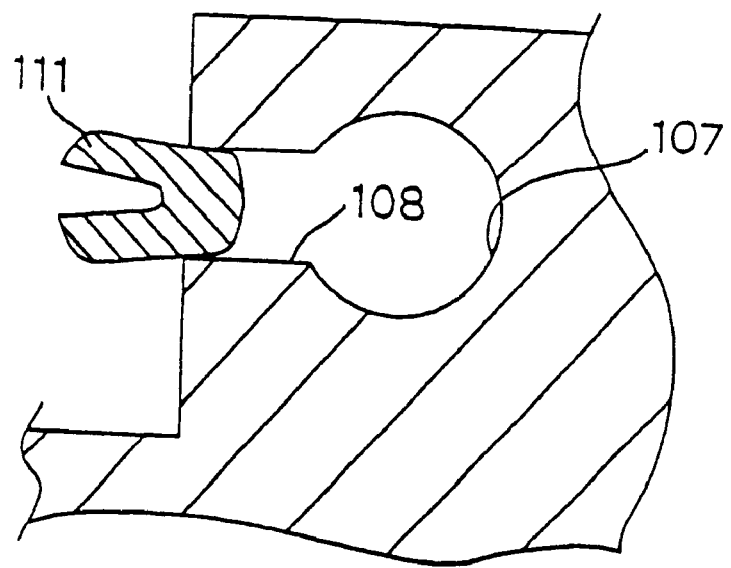
FIG. 25 is a sectional view showing, in enlarged form, the state of the support portion in the portable electronic device when the cover member is attached.
Figure 26:
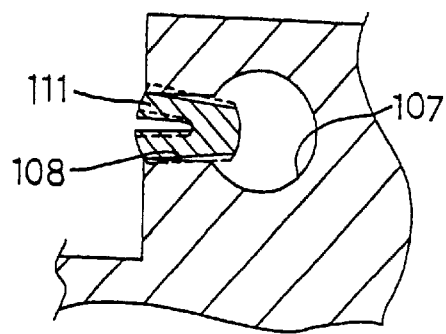
FIG. 26 is a sectional view, which follows upon FIG. 25, showing, in enlarged form, the state of the support portion in the portable electronic device when the cover member is attached.
Figure 27:
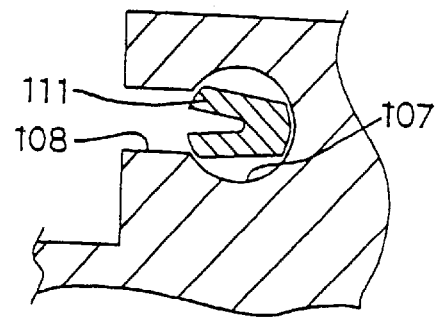
FIG. 27 is a sectional view, which follows upon FIG. 26, showing, in enlarged form, the state of the support portion in the portable electronic device when the cover member is attached.

The cover member 110 is removably attached to the housing 101, as illustrated in FIGS. 20 and 21. Specifically, as shown in FIGS. 23 and 24, at least one support pin 111 of the support pins 111, 112 of cover member 110 has a hollow portion that is open to the distal end and circumferential surface portion of the pin, as a result of which the pin is capable of being diametrically constricted resiliently in one direction. As shown in FIG. 22, the housing 101 is formed to have a groove 108 extending from the support hole 107, into which the diametrically constrictable support pin 111 is fitted, to the side of the housing 101. As shown in FIGS. 25 to 27, the cover member 110 is capable of being removably attached to the housing 101 by passing the diametrically constrictable support pin 111 through the interior of the groove 108 in the diametrically constricted state.

Figure 28:
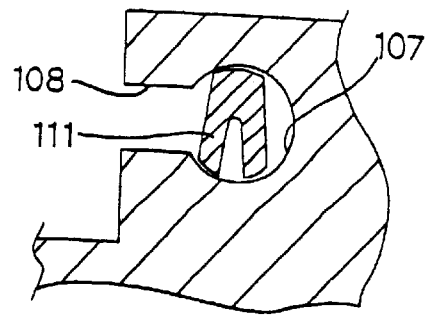
FIG. 28 is a sectional view showing, in enlarged form, the state of the support portion in the portable electronic device when the cover member has been closed.

The support pin 111 can be passed through the interior of the groove 108 in this manner when the cover member 110 is open. When the cover member 110 has been closed, the direction in which the support pin 111 is capable of diametrically constricted assumes a direction orthogonal to the width direction of the groove 108, as shown in FIG. 28. As a result, the support pin 111 can not be passed through the groove 108.

Figure 33:
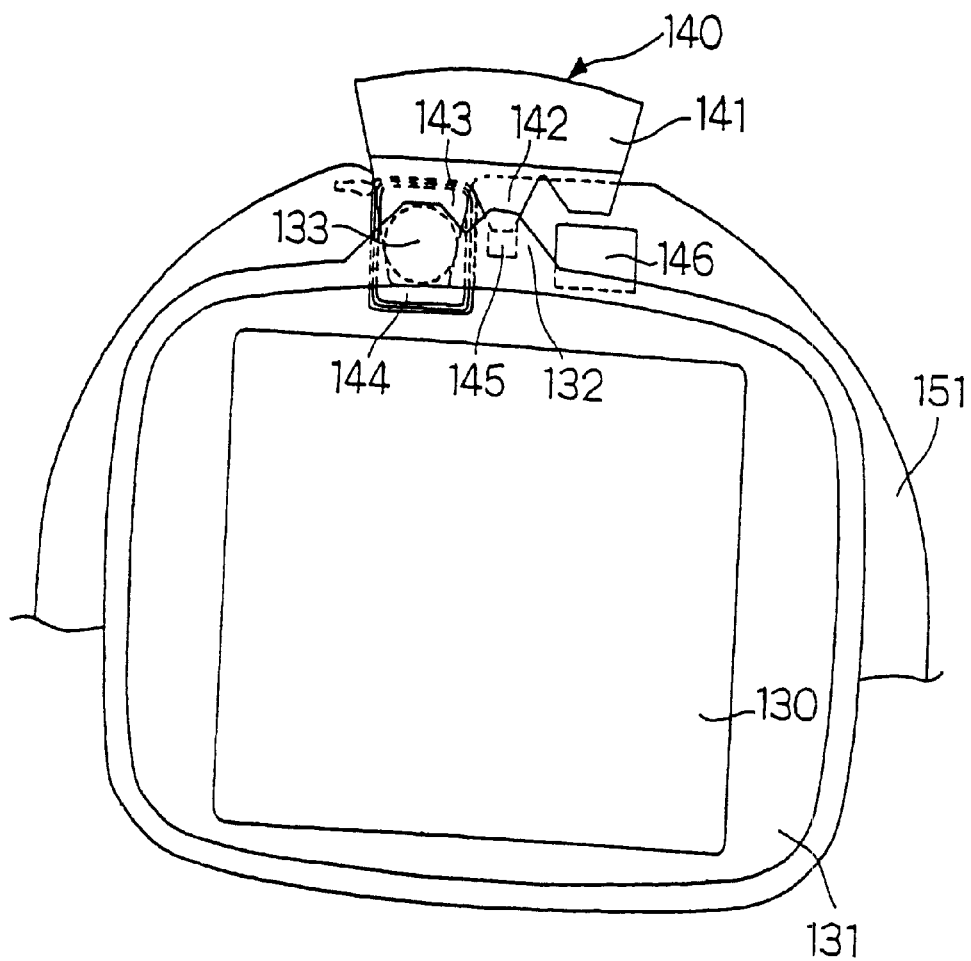
FIG. 33 is a plan view showing the construction of an infrared transceiving portion of the portable electronic device.

As shown in FIG. 33, the portable electronic device 100 has an optical system for guiding, in two directions, light from a display light source (LED) 145, which emits visible light for display purposes, and for making it possible for a light-receiving element 144, which receives infrared light for infrared communications with the external equipment, to receive infrared light from two directions.

"The two directions in which light from the display light source 145 is guided" and "the two directions in which the light-receiving element 144 receives infrared light" that are mentioned here refer to the side of the window 140 and the side of the display section 130. The window 140, which is provided on the upper end of the housing 101, is for allowing the infrared light to be projected outwardly from the housing 101. The infrared light is emitted by an infrared light source (LED) 146 and is for performing infrared communications with the external equipment.

The optical system includes a transparent protecting plate 131 for protecting the display section 130, and a prism 141 serving as an optical device provided in the window 140. As mentioned above, the display section 130 is disposed in the housing 101, constitutes display means facing toward the outside of the housing 101 via a through-hole provided in the front side of the housing 101, and comprises a liquid crystal display device (LCD).

The transparent protecting sheet 131 comprises a transparent material, such as an acrylic material, and is disposed so as to close the through-hole portion. The prism 141 also comprises a transparent material, such as an acrylic material, and is disposed so as to close the window 140.

The display section 130 is directed toward the front side of the housing 101 and is disposed to point in a direction different from that of the window 140 provided on the upper end of the housing 101. The infrared light source 146 is situated above the display section 130 and is disposed on the substrate 151 inside the housing 101. The display light source (LED) 145 that emits the visible light for display is situated above the display section 130 and is disposed on the substrate 151 inside the housing 101.

The light-receiving element 144, which receives the infrared light for performing infrared communications with the external equipment, is situated above the display section 130 and is disposed on the substrate 151 inside the housing 101. The infrared light source 146, display light source 145 and light-receiving element 144 are arrayed substantially in a single row.

Figure 34:
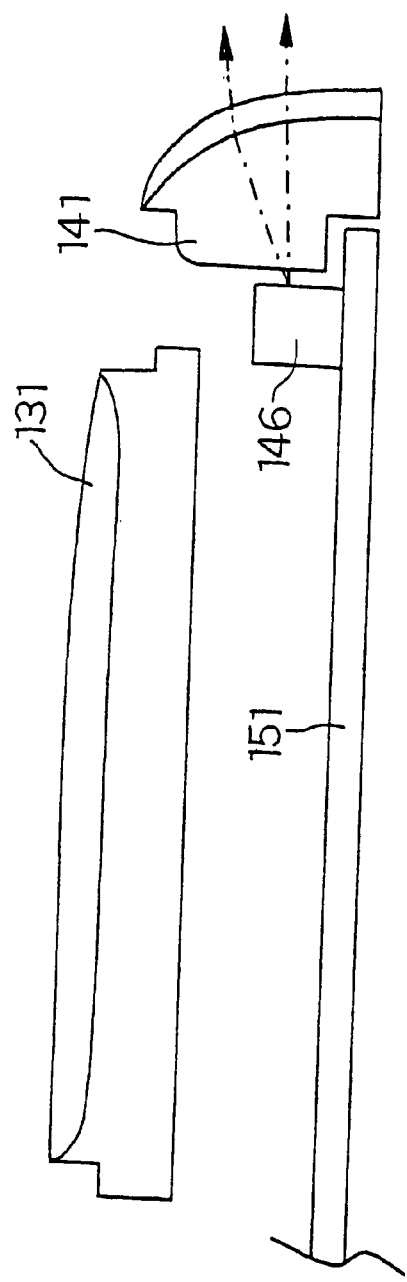
FIG. 34 is a sectional view showing the construction of an infrared transmitting portion of the portable electronic device.
Figure 35:
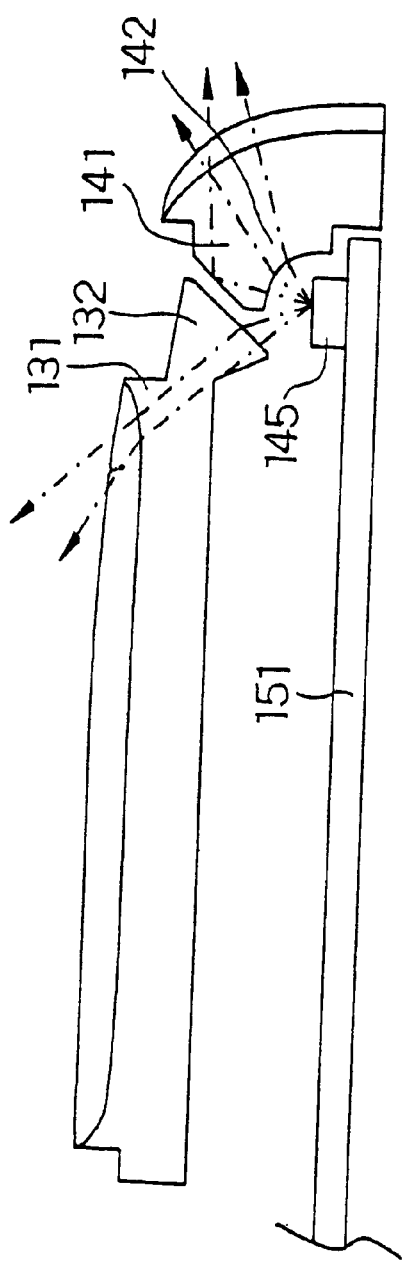
FIG. 35 is a sectional view showing the construction of a portion of the portable electronic device that emits visible light for display purposes.

As shown in FIG. 34, the prism 141 transmits the infrared light, which is emitted toward the window 140 by the infrared light source 146, through the window 140 so that the light is caused to exit from the housing 101. As shown in FIG. 35, the prism 141 has a projection 142 upon which the visible light emitted toward the display section 130 by the display light source 145 impinges. The visible light is reflected at the interface and is guided toward the side of the window 140, whence it is allowed to exit to the outside. Visible light that has passed through the projection 142 impinges upon the transparent protecting plate 131 from a projection 132 possessed by the transparent protecting plate 131, passes through the transparent protecting plate 131 and exits to the outside from the side of display section 130.

Thus, the window 140 allows not only the infrared light emitted by the infrared light source 146 to exit to the outside of the housing 101 but also the visible light emitted by the display light source 145.

Figure 36:
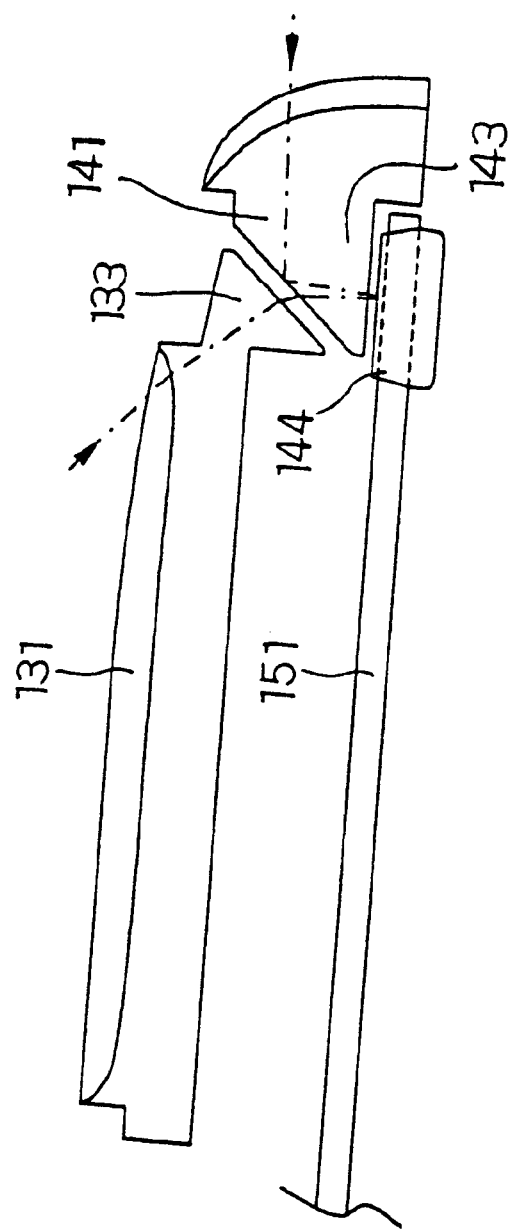
FIG. 36 is a sectional view showing the construction of an infrared receiving portion of the portable electronic device.

As shown in FIG. 36, the prism 141 has a projection 143 at the interface of which the infrared light that has entered from the window 140 is reflected so as to be guided toward the light-receiving element 144, where the infrared light is received. The infrared light incident upon the transparent protecting plate 131 from the side of the display section 130 enters the interior of the projection 143 of prism 141 from the projection 133 of the transparent protecting plate 131, passes through this projection and is received by the light-receiving element 144. Thus, the light-receiving element 144 receives infrared light from two directions, namely from the side of display section 130 and from the side of window 140.

A battery inserting structure formed on the back side of the housing 101 will be described with reference to FIG. 19 and FIGS. 37 to 41.

Figure 19:
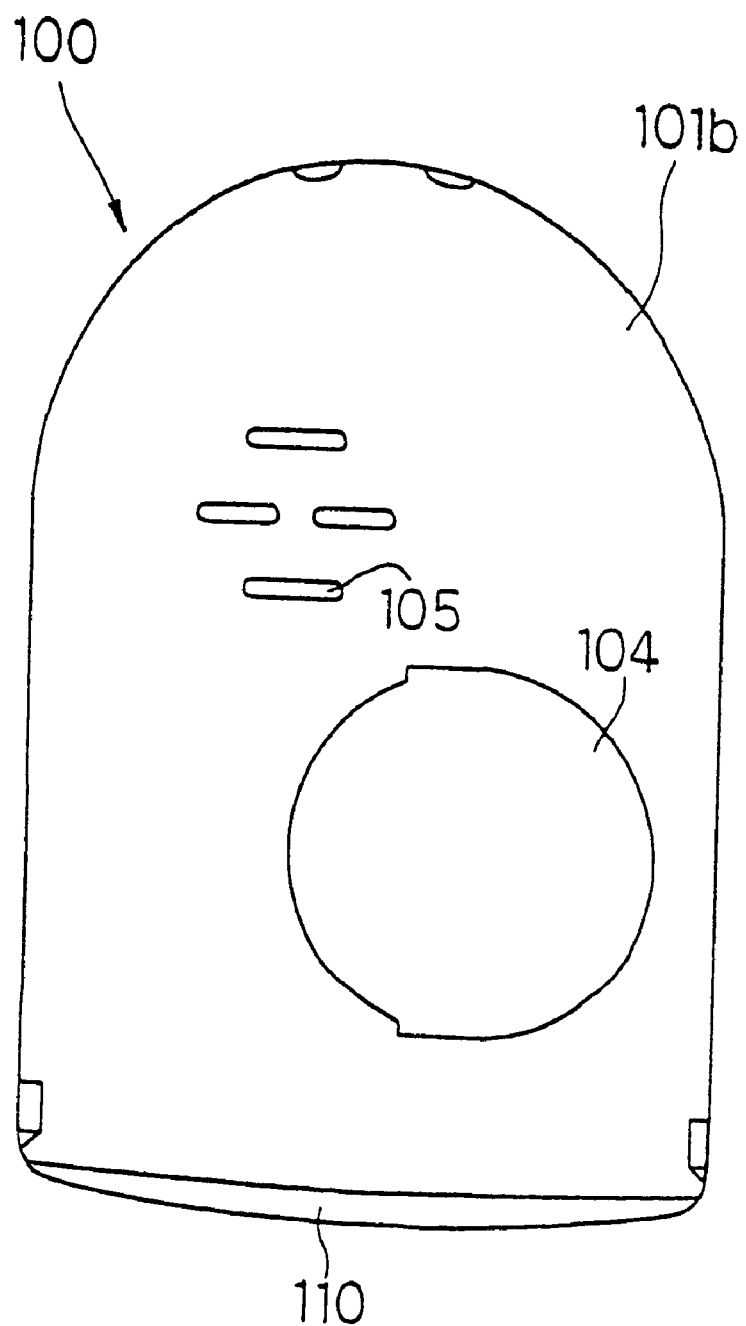
FIG. 19 is a back view showing the appearance of the portable electronic device.
Figure 37:
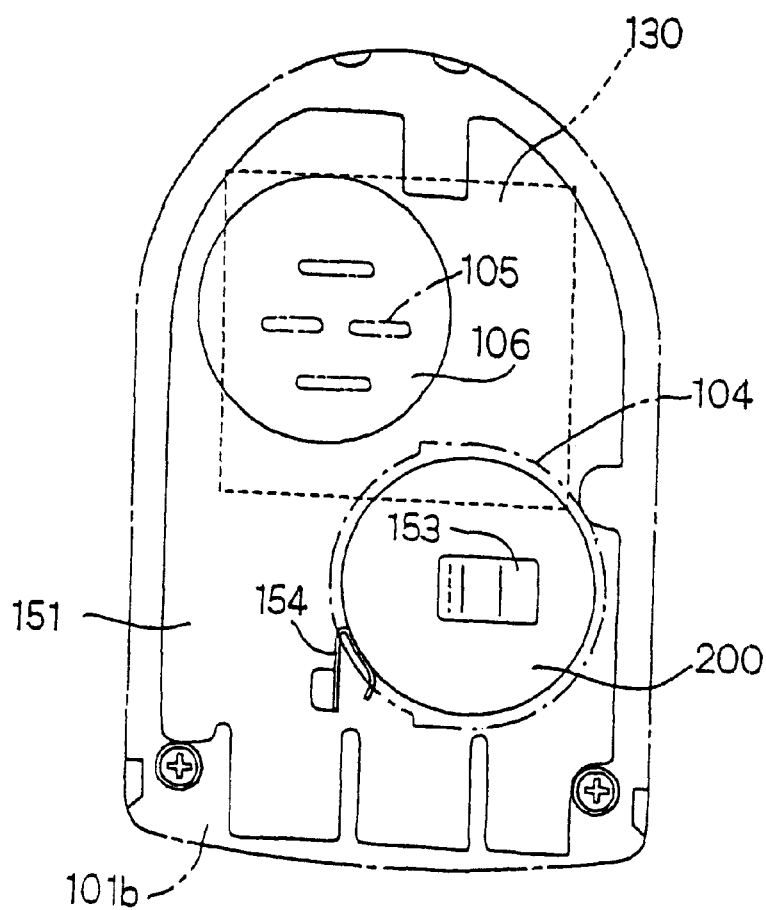
FIG. 37 is a back view showing a substrate and a battery insertion portion in the portable electronic device.

As mentioned above, the portable electronic device 100 is constructed to receive a battery 155 for supplying power. Specifically, a recessed battery insertion portion 200 is formed in the back side of the housing 101, as depicted in FIG. 19. A cathode power-source terminal 153 is disposed in the recessed battery insertion portion 200 on the bottom thereof and an anode power-source terminal 154 is disposed in such a manner that it is exposed to the inner circumferential surface of the battery insertion portion as shown in FIG. 37. The power-source terminals 153, 154 are electrically connected to the electronic circuitry on the substrate 151.

Figure 41:
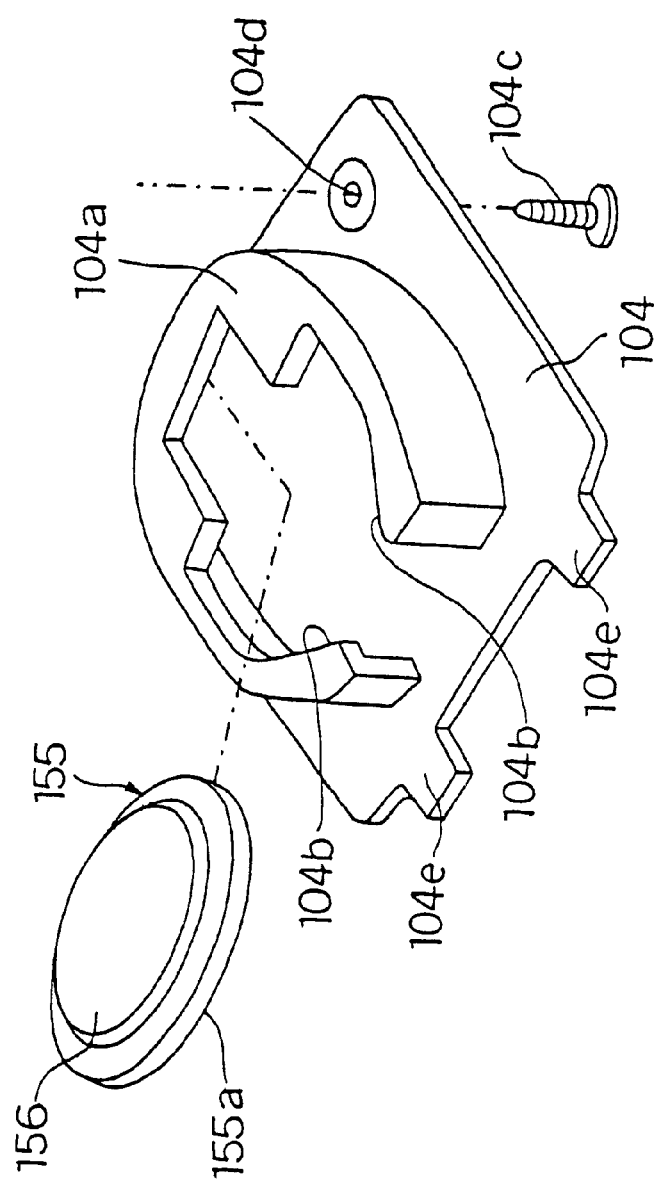
FIG. 41 is a perspective view showing the battery holder of FIG. 40 as seen from a different point of view.

In this embodiment, a so-called button battery is used as the battery 155. As illustrated in FIG. 41, the button battery (battery 155) has the external form of a disk and possesses an outer circumferential portion 155a that serves as an anode. The battery 155 further has a surface portion 156 serving as a cathode. The surface portion 156 is somewhat smaller in diameter than the battery proper and protrudes from the battery proper. As a result, a step is formed between the surface portion 156 and outer circumferential portion 155a.

Figure 38:
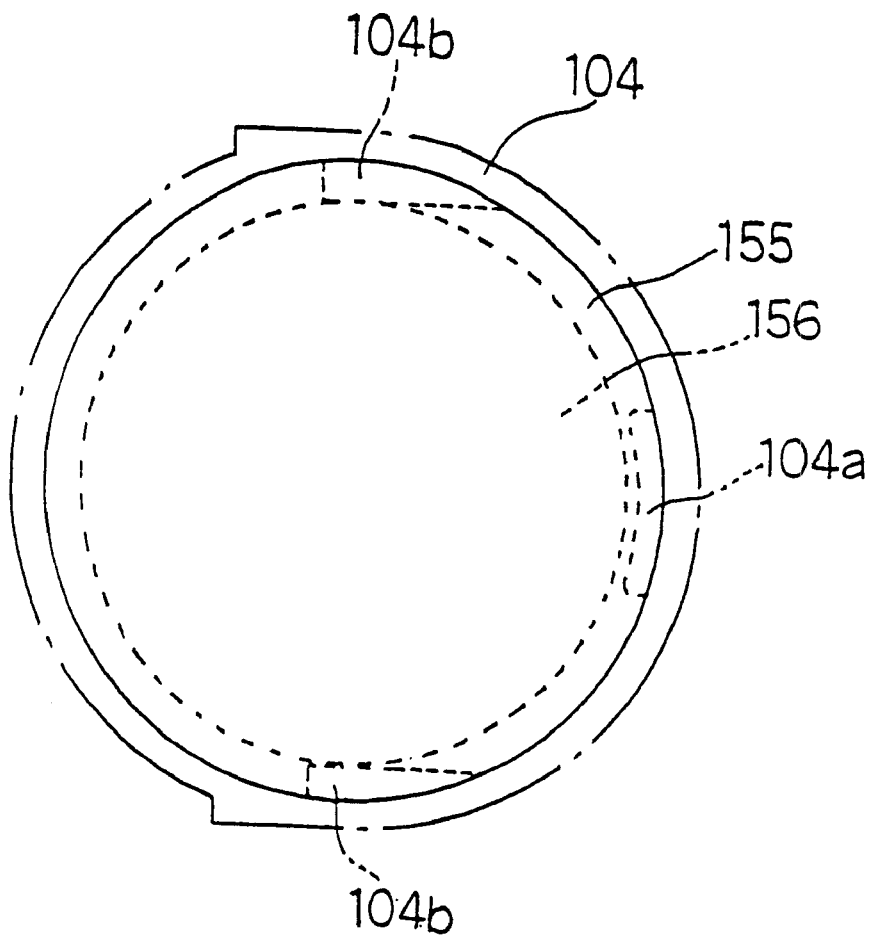
FIG. 38 is a back view showing the construction of a battery holder in the portable electronic device.

The battery insertion portion 200 for inserting the battery makes it possible for a battery holder 104 to be removably inserted, as shown in FIG. 19. As illustrated in FIG. 38, the battery holder 104 is formed in the general shape of a disk that is slightly larger than the battery 155, and the outer circumferential portion thereof is formed to have hook-shaped battery retainers 104a, 104b for holding the outer circumferential edge portion of the battery 155. Structurally, the hook-shaped battery retainers 104a, 104b grasp, at their hook-shaped distal ends, the stepped portion formed between the surface portion 156 and outer circumferential portion 155a of the battery 155.

Figure 39:
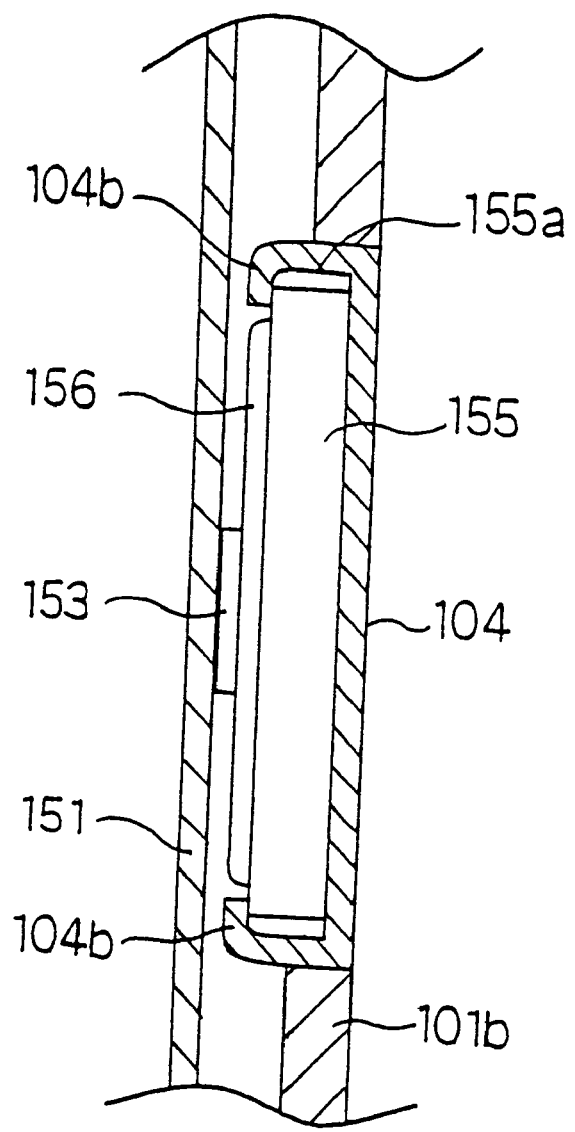
FIG. 39 is a sectional view showing the construction of a battery holder in the portable electronic device.

As illustrated in FIG. 39, the battery 155 is held in the battery holder 104 by fitting its outer circumferential edge portion between the battery retainers 104a, 104b, and the battery is installed in the battery insertion portion 200, which is located in the back side of the housing 101, together with the battery holder 104.

If it is attempted to fit the battery 155 between the battery retainers 104a, 104b in an upside-down attitude, i.e., with the surface portion 156 facing the side of the battery holder 104 proper, the outer circumferential edge portion (whose diameter is larger than that of the surface portion 156) of battery 155 will meet interference from the battery retainers 104a, 104b. This means that the battery 155 cannot be installed in the battery holder 104 unless it is in the normal attitude. As a result, insertion of the battery 155 into the battery insertion portion 200, which is formed in the housing 101, in a state in which the polarity is incorrect is avoided. More specifically, the battery retainers 104a, 104b construct erroneous-insertion prevention means for inserting the battery 155 into the battery insertion portion 200 of housing 101 in the proper attitude.

The outer circumferential portion 155a serving as the anode of battery 155, which has been inserted into the battery insertion portion 200 along with the battery holder 104, touches the anode power-source terminal 154, and the surface portion 156 serving as the cathode of the battery touches the cathode power-source terminal 153.

Figure 40:
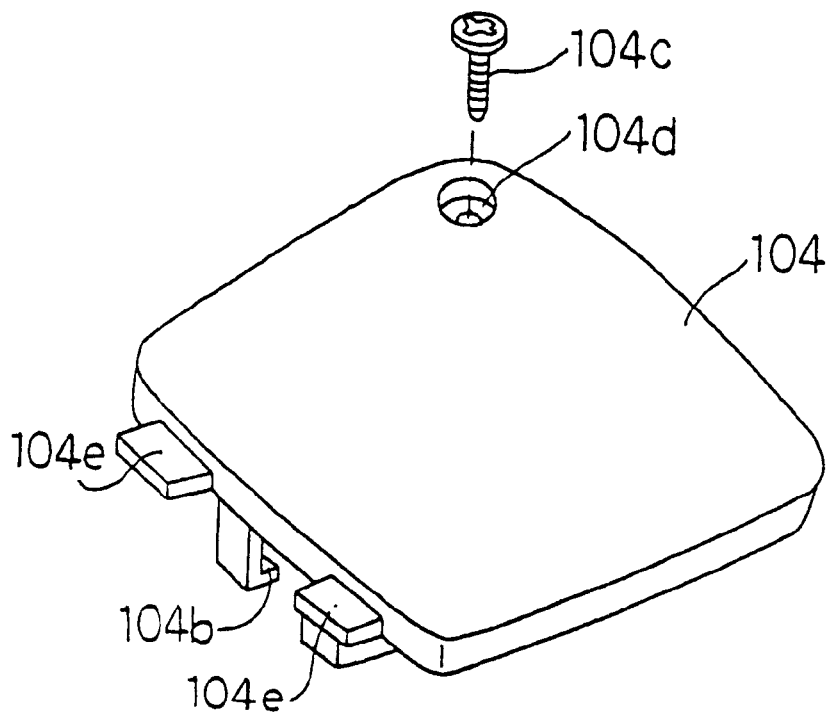
FIG. 40 is a perspective view showing another mode of a battery holder in the portable electronic device.

The battery holder 104 may be formed into the shape of a quadrangular plate, as shown in FIG. 40. The battery holder 104 may be provided with engagement projections 104e for engaging the edge of the opening of the battery insertion portion 200 formed in the back side of the housing 101, and with a screw hole 104d for screwing down the battery holder. A screw 104c is passed through the screw hole 104d and threadedly engaged with a threaded hole formed in the housing 101, thereby securing the battery holder 104 to the housing 101. As depicted in FIG. 41, the battery holder 104 has the battery retainers 104a, 104b on its rear side and retains the battery 155 between the battery retainers 104a, 104b in a prescribed polarity orientation.

In the description rendered above, the focus is on a button battery having the form of a disk, the outer circumferential portion 155a of which is the anode and the surface portion 156 of which is the cathode. However, this does not impose a limitation, for it is possible to construct battery holders in conformity with various battery shapes used for supplying the power of the portable electronic device 100. In such case the erroneous-insertion prevention means for holding the battery in the proper attitude would be configured for the particular battery holder.

Though not illustrated, a reset button for restoring the set state to the state set at the time of shipping is provided on the back side of the housing 101 inside a hole formed in the housing 101. The reset button is capable of being pushed by a pin or the like.

Figure 42A:
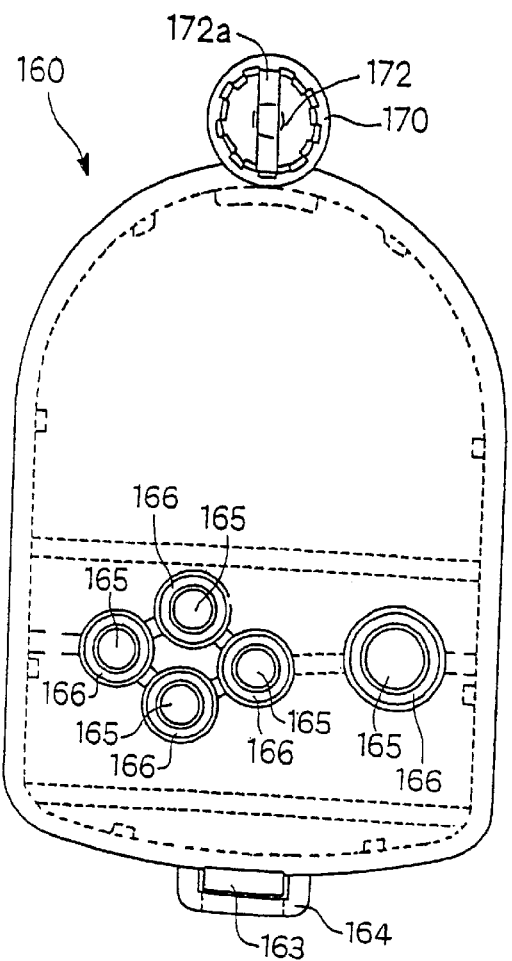
FIG. 42A is a front view showing a protective case which accommodates the portable electronic device.
Figure 42B:
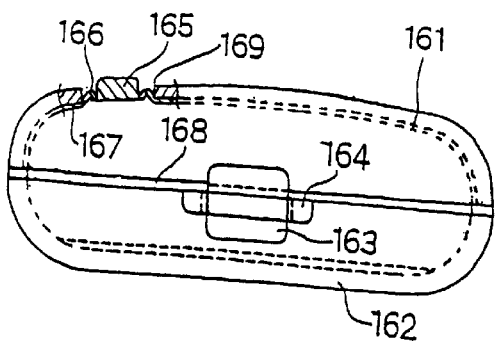
FIG. 42B is a bottom view showing the protective case which accommodates the portable electronic device.
Figure 43:
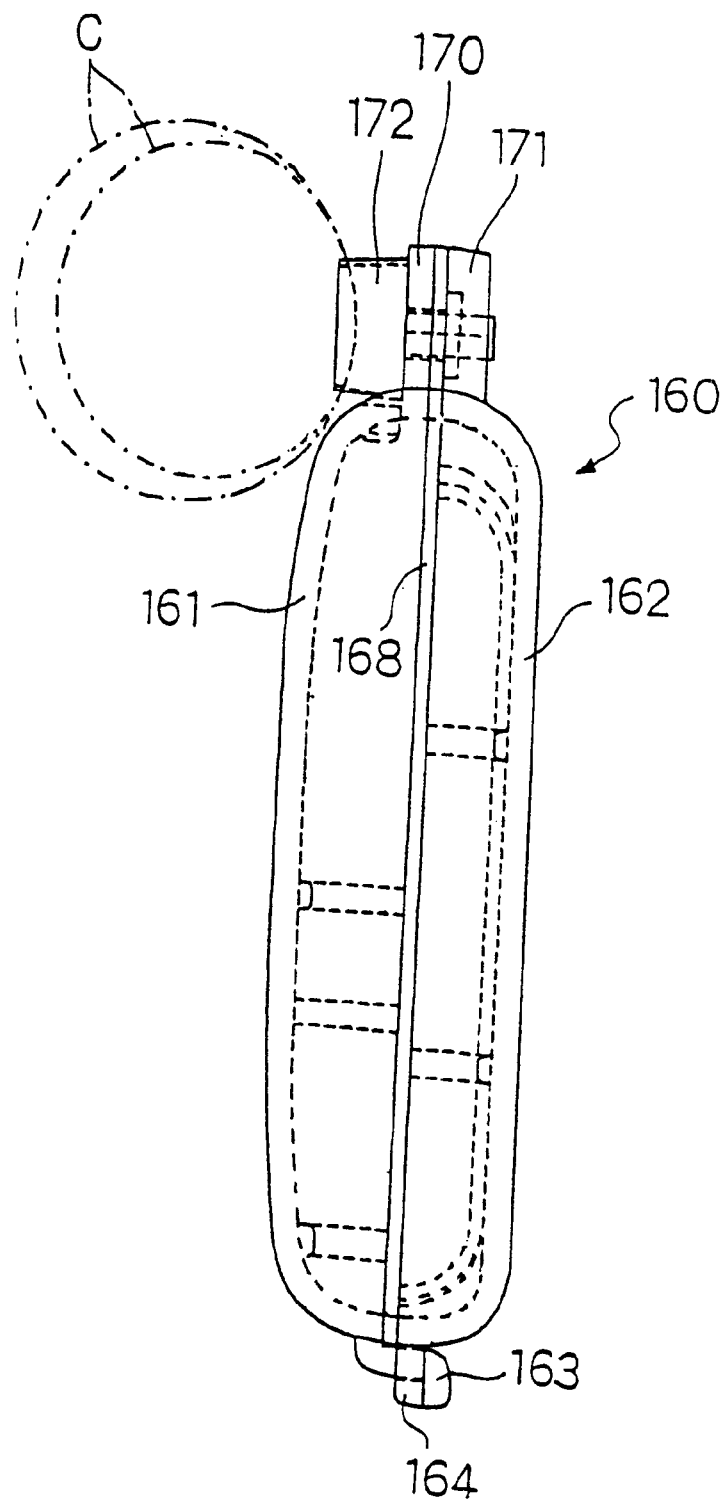
FIG. 43 is a side view the protective case which accommodates the portable electronic device.
Figure 44A:
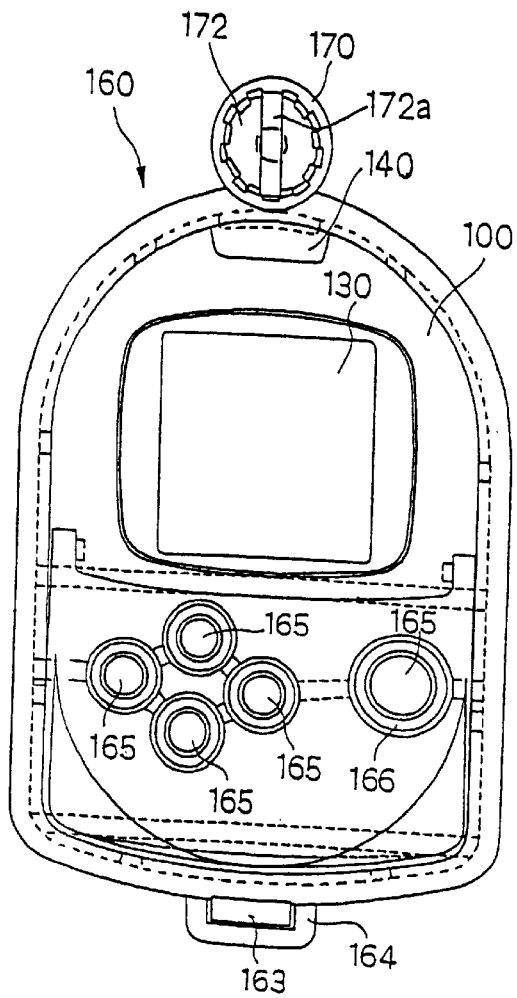
FIG. 44A is a front view showing a portable electronic device that has been accommodated in the protective case.
Figure 44B:
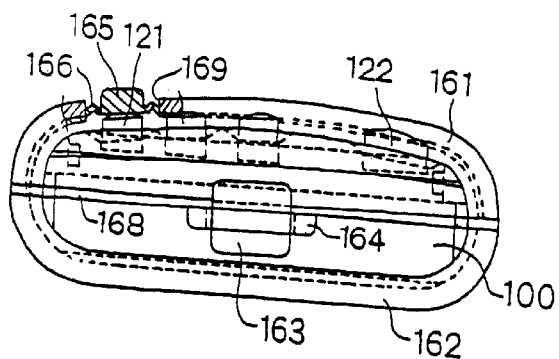
FIG. 44B is a bottom view showing a portable electronic device that has been accommodated in the protective case.
Figure 45:
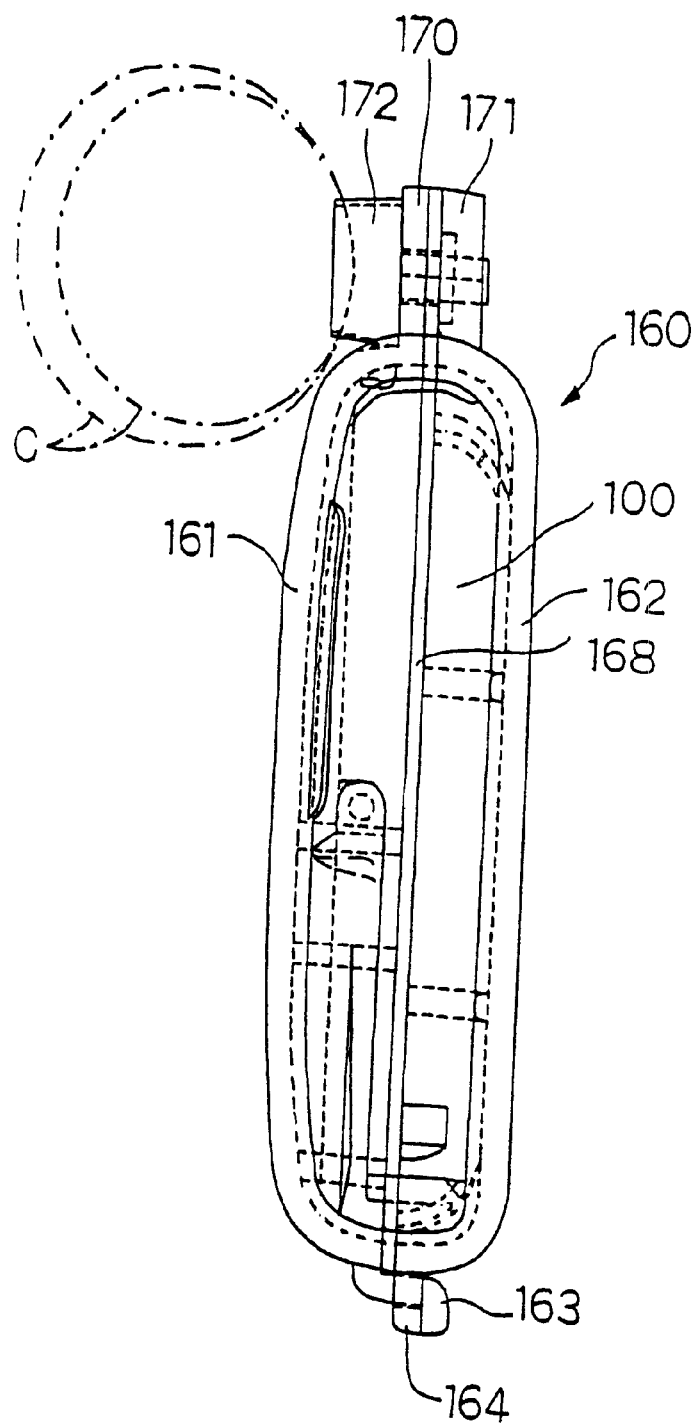
FIG. 45 is a side view showing a portable electronic device that has been accommodated in the protective case.
Figure 46A:
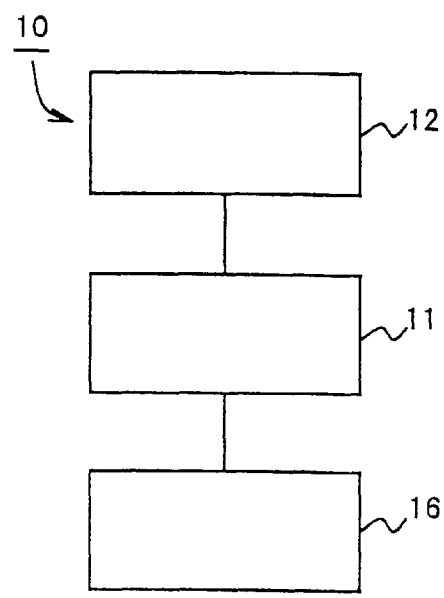
FIGS. 46A, 46B are diagrams showing an example of the construction of a conventional memory card.
Figure 46B:
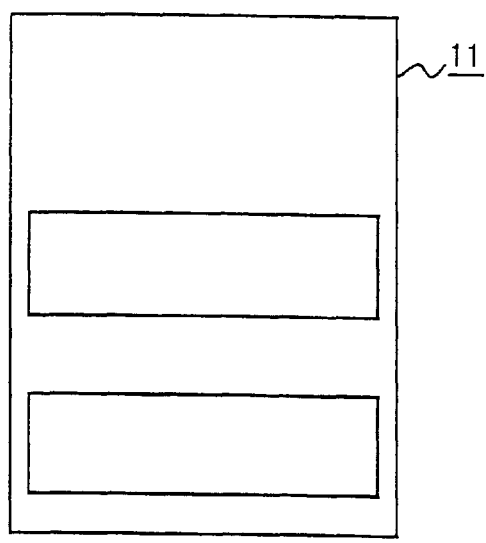
Figure 47:
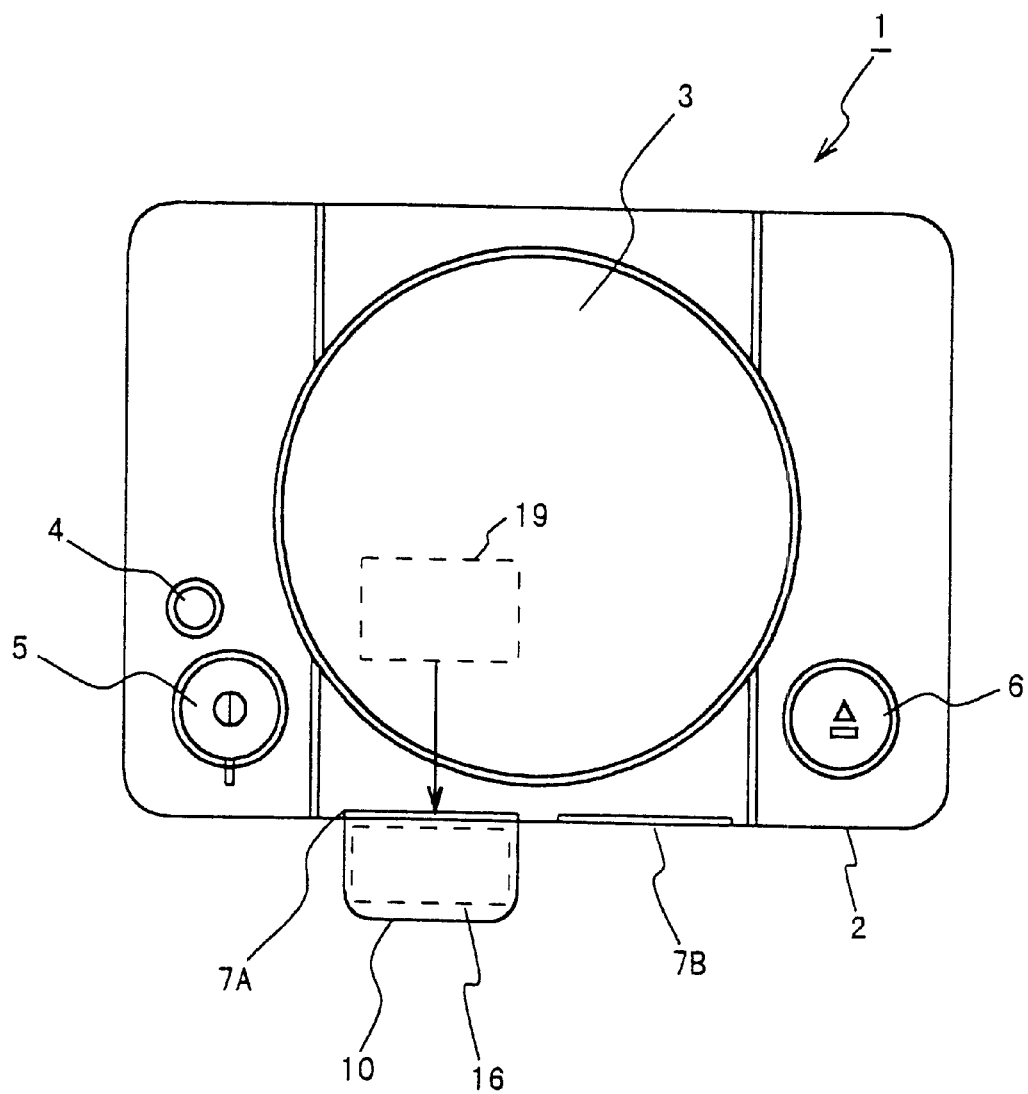
FIG. 47 is a diagram showing a conventional video game station that uses a memory card.

A protective case 160 for accommodating and protecting the portable electronic device 100 will be described with reference to FIGS. 42A to 45. FIGS. 42A to 43 illustrate the appearance of the protective case 160 when it is not accommodating the portable electronic device 100, and FIGS. 44A to 45 illustrate the appearance of the protective case 160 when it is accommodating the portable electronic device 100.

The protective case 160 accommodates the portable electronic device 100, as described above, therein and protects it.

The protective case 160 comprises an upper case 161 and a lower case 162. Abutting the upper case 161 and lower case 162 forms a closed interior space in which the portable electronic device 100 is received. The cases 161, 162 consist of a transparent synthetic resin such as polymethyl methacrylate or polycarbonate.

The cases 161, 162 have an engagement portion at one end thereof. The engagement portion is constituted by a hook-shaped engagement finger 163 provided on the upper case 161 and an engagement ring 164 provided on the lower case 162. By inserting the engagement finger 163 into the engagement ring 164 and abutting the cases 161, 162, a closed space can be formed inside the cases.

The other end of the cases 161, 162 is provided with a fastening portion. The latter is constituted by a screw receiving piece 170 provided on the upper case 161 and a screw insertion piece 171 provided on the lower case 162. The screw receiving piece 170 and screw insertion piece 171 align with each other when the cases 161, 162 are abutted against each other. Passing a fastening screw 172 through a screw receiving hole formed in the screw receiving piece 170 and threadedly engaging the fastening screw 172 with the screw hole of the screw insertion piece 171 fastens the screw receiving piece 170 and screw insertion piece 171 together, thereby holding the cases 161, 162 in the abutted state.

The head portion of the fastening screw 172 is formed to have a linear groove 172a in which the edge of a coin is capable of being fitted. That is, the fastening screw 172 can be turned with ease by fitting the edge of a coin C into the linear groove 172a of the head portion, as shown in FIGS. 43 and 45.

A plurality of through-holes 169 are provided in at least one of the cases 161, 162, e.g., the upper case 161. The through-holes 169 are provided at positions that will correspond to the operating elements 121, 122 of the portable electronic device 100 when the portable electronic device 100 has been accommodated in the space formed inside the cases 161, 162.

The through-holes 169 are closed by a closure member 167 a portion of which is equipped with push-buttons 165 and resilient pieces 166. The closure member 167 is formed from an elastic material (elastomer) and is affixed to the rear surface of the upper case 161. Owing to elastic deformation of the resilient pieces 166, the push-buttons 165 are capable of being moved in a direction in which they recede from the upper surface of the upper case 161.

The closure member 167 is formed as an integral part of a sealing member 168 that forms a seal between the abutted upper case 161 and lower case 162. By integrally forming the closure member 167 and sealing member 168 as a continuum, the member of components parts and the member of assembly steps can be reduced and manufacture can simplified.

The sealing member 168 is provided in the upper case 161 along the entire perimeter of its edge abutted by the lower case 162. The sealing member 168 is sandwiched between the cases 161, 162 when the upper case 161 and lower case 162 are abutted against each other, thereby providing a seal between the cases 161, 162. The sealing member 168 prevents water from penetrating into the interior of the protective case 160. More specifically, the protective case 160 not only protects the portable electronic device 100 against vibration and impact but also can be used as a waterproof cased by virtue of the sealing member 168.

When the portable electronic device 100 is accommodated within the protective case 160 with its display section 130 opposing the upper case 161, as shown in FIG. 45, each push-button comes into light contact with the pushing face of a respective one of the operating elements 121, 122 as shown in FIG. 44. Accordingly, with the portable electronic device 100 accommodated inside the protective case 160, pushing the push-buttons 165 makes it possible to push the push switches 157 via the operating elements 121, 122 and switch pushers 102, 103.

It should be noted that the area of the protective case 160 opposing the display section 130 of the portable electronic device 100 when the portable electronic device 100 has been accommodated may be shaped as a concave lens. That is, by causing the outer wall portion of this area of the protective case 160 to deform into a recessed shape, this portion will act as a concave lens and make it possible to view the display section 130 of the portable electronic device 100 in magnified form.

It should be noted that the protective case of the present invention is not limited to the slave of a video game station and can be applied broadly to various portable electronic devices.

Industrial Applicability

As described above, the protective case of a portable electronic device in accordance with the present invention protects the accommodated portable electronic device against moisture and dust and therefore is useful when carrying the portable electronic device to very moist, dusty places.

What is claimed is:

1. A removable protective case for accommodating a portable electronic device therein, said portable electronic device having at least one operating element, comprising:
    a) an upper case and a lower case with a closed spaced formed therebetween when said upper and lower cases are in abutment,
    b) a sealing member provided in said upper case for sealing the closed spaced when said upper and lower cases are in abutment, and
    c) an engagement portion on one end of said protective case and a fastening portion on the opposite end of said protective case, said engagement and fastening portions provided for holding the upper and lower cases in abutment,
    d) said upper case having at least one through-hole for accessing said at least one operating element through said upper case, said at least one through-hole being sealed by a closure member to prevent penetration and contamination of said closed space during abutment of said upper and lower cases.

2. A protective case in accordance with claim 1, wherein said at least one through-hole is aligned with said at least one operating element for operation of said operating element through said at least one through-hole.

3. A protective case in accordance with claim 1, wherein said closure member is formed from an elastic material.

4. A protective case in accordance with claim 1, wherein said sealing member is formed from an elastic material.

5. A protective case in accordance with claim 1, further comprising at least one push button provided on said closure member, said push button adapted for engagement with said operating element on said portable electronic device through said at least one through-hole.

6. A protective case in accordance with claim 2, further comprising at least one push button provided on said closure member, said push button adapted for engagement with said operating element on said portable electronic device through said at least one through-hole.

7. A protective case in accordance with claim 1, wherein said engagement portion further comprises an engagement ring on one of said upper or lower cases and an engagement finger on the other of said upper or lower cases, said engagement finger adapted for insertion into said engagement ring.

8. A protective case in accordance with claim 1, wherein said fastening portion further comprises a fastener receiving piece on one of said upper or lower cases and a fastener insertion piece on the other of said upper or lower cases, said fastener receiving piece adapted for passage of a fastener therethrough, and said fastener insertion piece adapted for receiving said fastener therein.

9. A protective case in accordance with claim 8, wherein said fastener is a threaded fastener.

10. A protective case in accordance with claim 9, wherein said threaded fastener has a head portion with a linear groove formed thereon, said linear groove dimensioned to receive a coin to facilitate rotation of said fastener.

11. A protective case in accordance with claim 1, wherein said closure member and said sealing member are integrally formed as a continuum.

12. A protective case in accordance with claim 1, where said sealing member is provided along the perimeter of said upper case and is sandwiched between said upper and lower cases during abutment of such cases.

13. A protective case in accordance with claim 1, wherein the portable electronic device is further provided with a display section, and the section of the protective case opposite the display section when the portable electronic device is contained therein is further shaped to act as a concave lens to allow for viewing of the display section through the protective case in a magnified form.

14. A protective case in accordance with claim 1, wherein at least one of said upper and lower cases is made from a transparent material.

15. A protective case in accordance with claim 14, wherein said transparent material comprises a transparent synthetic resin.

16. A protective case in accordance with claim 15, wherein said transparent synthetic resin is polymethyl methacrylate.

17. A protective case in accordance with claim 15, wherein said transparent synthetic resin is polycarbonate.

18. A protective case for accommodating a portable electronic device therein, said portable electronic device having at least one side with at least one operating element, comprising:
    a) an upper case and a lower case with an interior formed therebetween when said upper and lower cases are in abutment, said interior dimensioned to accommodate said portable electronic device therein, with said upper case positioned adjacent said at least one side of said portable electronic device having said at least one operating element,
    b) a resilient sealing member disposed between said upper and lower cases for sealing the interior when said upper and lower cases are in abutment,
    c) said upper case having at least one through-hole for accessing said at least one operating element through said upper case, said at least one through-hole being sealed by an elastic closure member to prevent penetration and contamination of said interior during abutment of said upper and lower cases, said closure member having at least one push button adapted for engagement with said at least one operating element on said portable electronic device.

19. A protective case in accordance with claim 18, wherein said at least one through-hole is positioned opposite said at least one operating element for push button operation of said operating element through said protective case.

20. A protective case in accordance with claim 18, further comprising an engagement portion on one end of said protective case, said engagement portion further comprising an engagement ring on one of said upper or lower cases and an engagement finger on the other of said upper or lower cases, said engagement finger adapted for insertion into said engagement ring.

21. A protective case in accordance with claim 20, further comprising a fastening portion on the end of said protective case opposite said engagement portion, said fastening portion further comprising a fastener receiving piece on one of said upper or lower cases and a fastener insertion piece on the other of said upper or lower cases, said fastener receiving piece adapted for passage of a fastener therethrough, and said fastener insertion piece adapted for receiving said fastener therein.

22. A protective case in accordance with claim 21, wherein said fastener is a threaded fastener having a head portion with a linear groove formed thereon, said linear groove dimensioned to receive a coin to facilitate rotation of said fastener.

23. A protective case in accordance with claim 18, wherein said closure member and said sealing member are integrally formed as a continuum.

24. A protective case in accordance with claim 23, where said sealing member is provided along the perimeter of said upper case and is sandwiched between said upper and lower cases during abutment of such cases.

25. A protective case in accordance with claim 18, wherein the portable electronic device is further provided with a display section, and the section of the protective case opposite the display section when the portable electronic device is contained therein is further shaped to act as a concave lens to allow for viewing of the display section through the protective case in a magnified form.

26. A protective case in accordance with claim 18, wherein at least one of said upper and lower cases is made from a transparent material.

27. A protective case in accordance with claim 26, wherein said transparent material comprises a transparent synthetic resin.

28. A protective case in accordance with claim 27, wherein said transparent synthetic resin is selected from the group of polymethyl methacrylate or polycarbonate.

29. A protective case for accommodating a portable electronic device therein, said portable electronic device having a plurality of operating elements and a display section, comprising:
   a) an upper case and a lower case with an interior space defined by the abutment of said upper and lower cases, said interior space dimensioned to receive and enclose said portable electronic device,
   b) said portable electronic device arranged within said interior space such that the upper case is positioned opposite the operating elements and the display section during the abutment of said upper and lower cases,
   c) an elastic sealing member provided along the perimeter of said upper case for sealing the interior space during the abutment of said upper and lower cases, and
   d) an engagement portion on one end of said protective case and a fastening portion on the opposite end of said protective case, said engagement and fastening portions provided for holding the upper and lower cases in abutment,
   e) said upper case having a plurality of through-holes for accessing said operating elements, said through-holes arranged for alignment with the operating elements of said portable electronic device,
   f) said plurality of through-holes sealed by an elastic closure member integrally formed as a continuum with said sealing member,
   g) said closure member provided with push buttons arranged for pressing engagement with said operating elements, said push buttons arranged on said closure member within said through-holes, said push buttons further seated on resilient pieces that enable movement of said push buttons into engagement with said operating elements.

30. A protective case in accordance with claim 29, wherein said engagement portion further comprises an engagement ring on one of said upper or lower cases and an engagement finger on the other of said upper or lower cases, said engagement finger adapted for insertion into said engagement ring.

31. A protective case in accordance with claim 30, wherein said fastening portion further comprises a fastener receiving piece on one of said upper or lower cases and a fastener insertion piece on the other of said upper or lower cases, said fastener receiving piece adapted for passage of a threaded fastener therethrough, and said fastener insertion piece adapted for receiving said threaded fastener therein.

32. A protective case in accordance with claim 31, wherein said threaded fastener has a head portion with a linear groove formed thereon, said linear groove dimensioned to receive a coin to facilitate rotation of said fastener.

33. A protective case in accordance with claim 29, wherein the section of said protective case opposite the display section when the portable electronic device is contained therein is further shaped to act as a concave lens to allow for viewing of the display section through the protective case in a magnified form.

34. A protective case in accordance with claim 29, wherein the upper and lower cases are made from a transparent material.

35. A protective case in accordance with claim 34, wherein said transparent material comprises a transparent synthetic resin.

36. A protective case in accordance with claim 35, wherein said transparent synthetic resin is polymethyl methacrylate.

37. A protective case in accordance with claim 35, wherein said transparent synthetic resin is polycarbonate.

* * * * *